US006931633B1

(12) United States Patent
Vazquez et al.

(10) Patent No.: US 6,931,633 B1
(45) Date of Patent: Aug. 16, 2005

(54) SYSTEM AND METHOD OF EVALUATING THE PERFORMANCE OF AN IMAGE PROCESSING ALGORITHM

(75) Inventors: Nicolas Vazquez, Austin, TX (US); Kevin L. Schultz, Georgetown, TX (US)

(73) Assignee: National Instruments Corporation, Austin, TX (US)

( * ) Notice: Subject to any disclaimer, the term of this patent is extended or adjusted under 35 U.S.C. 154(b) by 473 days.

(21) Appl. No.: 09/629,653

(22) Filed: Aug. 1, 2000

(51) Int. Cl.$^7$ .............................................. G06F 9/44
(52) U.S. Cl. ..................................... 717/131; 717/115
(58) Field of Search ............................... 345/769, 863; 395/169; 704/8, 9; 707/5; 715/530, 533, 715/539, 772; 717/541, 127, 130, 150, 154, 717/158–159, 131, 132, 133; 702/182, 186; 352/173

(56) References Cited

U.S. PATENT DOCUMENTS

| | | | | |
|---|---|---|---|---|
| 5,265,254 A | * | 11/1993 | Blasciak et al. ............ | 717/130 |
| 5,293,429 A | * | 3/1994 | Pizano et al. ............... | 382/202 |
| 5,481,712 A | | 1/1996 | Silver et al. | |
| 5,606,707 A | * | 2/1997 | Tomassi et al. ............. | 345/418 |
| 5,724,494 A | * | 3/1998 | Politis ........................ | 345/592 |
| 5,748,878 A | * | 5/1998 | Rees et al. .................. | 717/130 |
| 6,108,659 A | * | 8/2000 | Vincent ...................... | 717/141 |
| 6,125,390 A | * | 9/2000 | Touboul ..................... | 717/127 |
| 6,141,012 A | * | 10/2000 | Bollman et al. ............ | 345/418 |
| 6,157,732 A | | 12/2000 | Drisko et al. | |
| 6,161,200 A | * | 12/2000 | Rees et al. .................. | 717/130 |
| 6,243,738 B1 | * | 6/2001 | Hayles et al. ............... | 709/203 |
| 6,282,699 B1 | * | 8/2001 | Zhang et al. ............... | 717/109 |
| 6,298,474 B1 | * | 10/2001 | Blowers et al. ............ | 717/104 |
| 6,311,327 B1 | * | 10/2001 | O'Brien et al. ............ | 717/114 |
| 6,408,429 B1 | * | 6/2002 | Marrion et al. ............ | 717/100 |

OTHER PUBLICATIONS

"Release Notes, IMAQ Vision Builder, Version 5.0," Oct. 1999, National Instruments, pp. 1-4.*
"SOLARIS User's Guide," 1995, Sun Microsystems, Inc., pp. i-xxviii, 323-330.*

(Continued)

*Primary Examiner*—Tuan Dam
*Assistant Examiner*—Eric B. Kiss
(74) *Attorney, Agent, or Firm*—Meyertons Hood Kivlin Kowert & Goetzel, P.C.; Jeffrey C. Hood; Jason L. Burgess

(57) ABSTRACT

A system and method for creating an image processing algorithm and automatically evaluating the performance of the algorithm. A user may develop an image processing algorithm in an image prototyping environment. The image prototyping environment may provide image processing functions for analyzing, processing, or manipulating various types of images. Once the user has developed an image processing algorithm, the user may execute the algorithm. In response to executing the algorithm, the execution time requirements of the algorithm may be determined. This information may be used, for example, in order to determine whether the image processing algorithm is fast enough to evaluate images that are acquired at a particular rate in a real-time application. The information may also help the user identify portions of the algorithm that need to be modified, e.g., because they are bottlenecks in the algorithm. In the preferred embodiment, the image prototyping environment is operable to automatically generate a program implementing the image processing algorithm, once the user is satisfied with the performance of the algorithm.

13 Claims, 22 Drawing Sheets

OTHER PUBLICATIONS

"Image processing from FOLDOC,"[online[ 1995 [accessed Dec. 10, 2003], Retrieved from Internet <URL: http://wombat.doc.ic.ac.uk/foldoc/foldoc.cgi?image+processing>, p. 1.*

Neil Thacker, "Introduction,"[online] 1998 [accessed Dec. 10, 2003], Retrieved from Internet <URL: http://web.archive.org/web/19990829023301/www.niac.man.ac.uk/Tina/docs/user_guide/node57.html>, pp. 1-2.*

F. Torres, et al., "Simulation and Scheduling of Real-Time Computer Vision Algorithms," 1999, Springer-Verlag Heidelberg, ICVS'99, LNCS 1542, pp. 98-114.*

"IMAQ Vision Builder Tutorial," National Instruments, Jan. 1999.

"IMAQ Vision User Manual," National Instruments, May 1999.

* cited by examiner

Image after Processing

Original Image (Metal3.jpg)

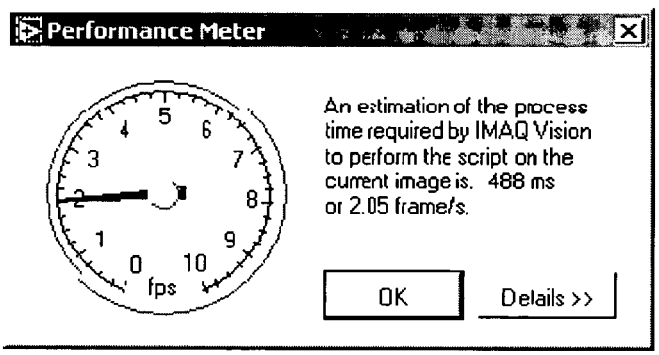
FIG. 12
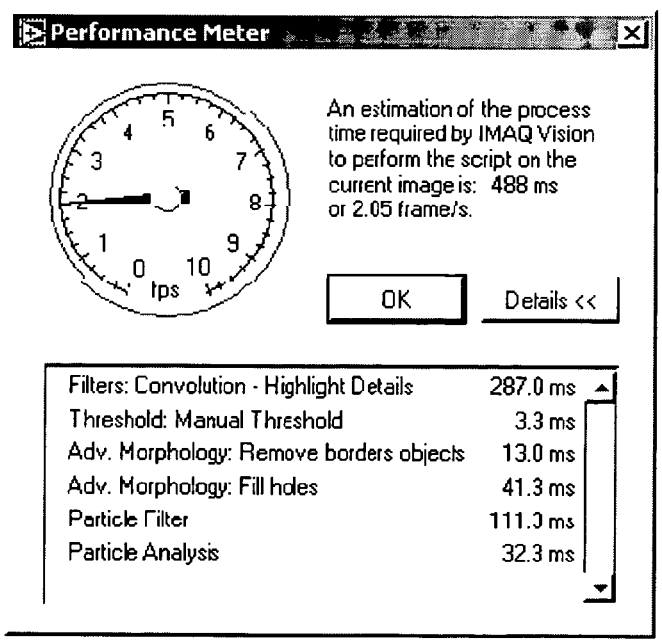
FIG. 13
FIG. 14

SYSTEM AND METHOD OF EVALUATING THE PERFORMANCE OF AN IMAGE PROCESSING ALGORITHM

FIELD OF THE INVENTION

The present invention relates to the field of image processing, and in particular to an image processing prototyping environment operable to develop image processing algorithms in response to user input.

DESCRIPTION OF THE RELATED ART

Traditionally, high level text-based programming languages have been used by programmers in writing application programs. Many different high level programming languages exist, including BASIC, C, JAVA, FORTRAN, Pascal, COBOL, ADA, APL, etc. Programs written in these high level languages are translated to the machine language level by translators known as compilers or interpreters. The high level programming languages in this level, as well as the assembly language level, are referred to herein as conventional programming environments.

Increasingly computers are required to be used and programmed by those who are not highly trained in computer programming techniques. When conventional programming environments are used, the user's programming skills and ability to interact with the computer system often become a limiting factor in the achievement of optimal utilization of the computer system.

There are numerous subtle complexities which a user must master before he can efficiently program a computer system in a conventional programming environment. The task of programming a computer system to model or implement a process often is further complicated by the fact that a sequence of mathematical formulas, mathematical steps or other procedures customarily used to conceptually model a process often does not closely correspond to the conventional programming techniques used to program a computer system to model such a process. In other words, the requirement that a user program in a conventional programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a conventional programming environment to implement his model, the efficiency with which the computer system can be utilized to perform such modeling often is reduced.

Examples of fields in which computer systems are employed to model and/or control physical systems are the fields of instrumentation, process control, industrial automation, and simulation. Computer modeling or control of devices such as instruments or industrial automation hardware has become increasingly desirable in view of the increasing complexity and variety of instruments and devices available for use. However, due to the wide variety of possible testing/control situations and environments, and also the wide array of instruments or devices available, it is often necessary for a user to develop a custom program to control a desired system. As discussed above, computer programs used to control such systems traditionally had to be written in conventional programming languages such as, for example, assembly language, C, FORTRAN, BASIC, or Pascal. Traditional users of these systems, however, often were not highly trained in programming techniques and, in addition, conventional programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

Thus, various types of high-level prototyping environments have been developed that are targeted toward enabling users to easily create various types of specialized programs or algorithms. One example of such a specialized prototyping environment relates to the field of image processing. The term "image processing" is used herein to refer to image processing, image analysis, and machine vision, among others. Image prototyping environments have been developed for rapidly developing image applications, e.g., for machine vision, pattern matching, shape matching, or other applications. Such an image prototyping environment may enable a user to easily and quickly experiment with an image, applying various image processing functions in order to manipulate, process, or analyze the image.

Algorithms developed in image prototyping environments are often intended for use in a real time environment, e.g., in order to inspect components as they are manufactured. Thus, evaluating the performance of an image processing algorithm may be very important, e.g., to determine whether the algorithm is capable of processing images at a required rate.

SUMMARY OF THE INVENTION

One embodiment of the present invention comprises a system and method for creating an image processing algorithm and automatically evaluating the performance of the algorithm. A user may develop an image processing algorithm in an image prototyping environment. The image prototyping environment may provide image processing functions for analyzing, processing, or manipulating various types of images, such as binary, grayscale, color, or complex images. The image prototyping environment may include a user interface enabling the user to easily apply the image processing functions to an image and immediately see the results, in order to develop the desired algorithm. In various embodiments, any of various types of image processing functions may be supported, including filtering functions, morphology functions, histogram functions, particle analysis functions, edge detection functions, etc. As the user applies each image processing function to an image, the function may be recorded as a step in a script, recipe, or computer program. The script essentially specifies an image processing algorithm; i.e., an image processing algorithm may be defined by the plurality of steps in a script.

Once the user has developed an image processing algorithm, the user may execute or run the algorithm. Executing or running the algorithm may comprise executing or running executable code associated with each of the individual image processing functions that define the algorithm. In response to executing the algorithm, the execution time requirements of the algorithm may be determined. The execution time requirements of each of the individual image processing functions may also be determined. The determined time requirements may be displayed to the user. A rate at which images can be processed by the algorithm may also be displayed. This information may be used, for example, in order to determine whether the image processing algorithm is fast enough to evaluate images that are acquired at a particular rate in a real-time application. The information may also help the user identify portions of the algorithm that need to be modified, e.g., because they are bottlenecks in the algorithm.

In one embodiment, the user may specify one or more images on which to run the algorithm, which may enable the determination of an average time requirement for processing various types of images. Also, in one embodiment the user may specify a desired number of times to run the algorithm, which may enable minor fluctuations in the running time of the algorithm to be taken into account.

In one embodiment, the image prototyping environment may automatically or programmatically generate suggested changes in parameters of steps (image processing functions) in the script, or changes in steps, to adjust the execution time, possibly in response to user input execution time criteria.

Information regarding various general image processing categories may also be displayed to the user. For example, the total time requirements for each function in the algorithm related to morphology operations may be summed and displayed as one category. Another category may relate to the total time requirements for steps involved with manipulating color information of the image. Other examples of possible categories include steps related to filtering functions, steps related to histogram functions, steps related to pattern matching functions, etc. In various embodiments, the categories may be separated into any level of granularity as desired and may be customized by the user.

In the preferred embodiment, the image prototyping environment is operable to automatically generate a program implementing the image processing algorithm, once the user is satisfied with the performance of the algorithm. Alternatively, the script created by the image prototyping environment may itself be a computer program. Thus, the execution time of the program in the image prototyping environment and the execution time of the program outside of the image prototyping environment should be the same.

In various embodiments, different types of programs, including text-based programs, e.g., C, BASIC, or JAVA programs, etc., and graphical programs, e.g., LABVIEW programs, may be created from a script. The program code implementing the image processing functions of the algorithm preferably has an execution time that is proportional or equivalent to the execution time of the executable code described above that is called when the algorithm runs under control of the image prototyping environment. For example, in one embodiment, the executable code called by the prototyping environment and the executable code used in the program may be the same, e.g., by calling a shared library or common component in both cases. In another embodiment, the generated program may utilize an image processing library that is associated with the image prototyping environment, e.g., a library that is provided by the vendor of the prototyping environment, so that the various image processing functions are implemented in the same way in both cases, and thus have equivalent running times.

BRIEF DESCRIPTION OF THE DRAWINGS

A better understanding of the present invention can be obtained when the following detailed description of the preferred embodiment is considered in conjunction with the following drawings, in which:

FIGS. 12–14 illustrate exemplary user interface windows related to the execution performance of the algorithm that the image prototyping environment may display;

Figure 1A:
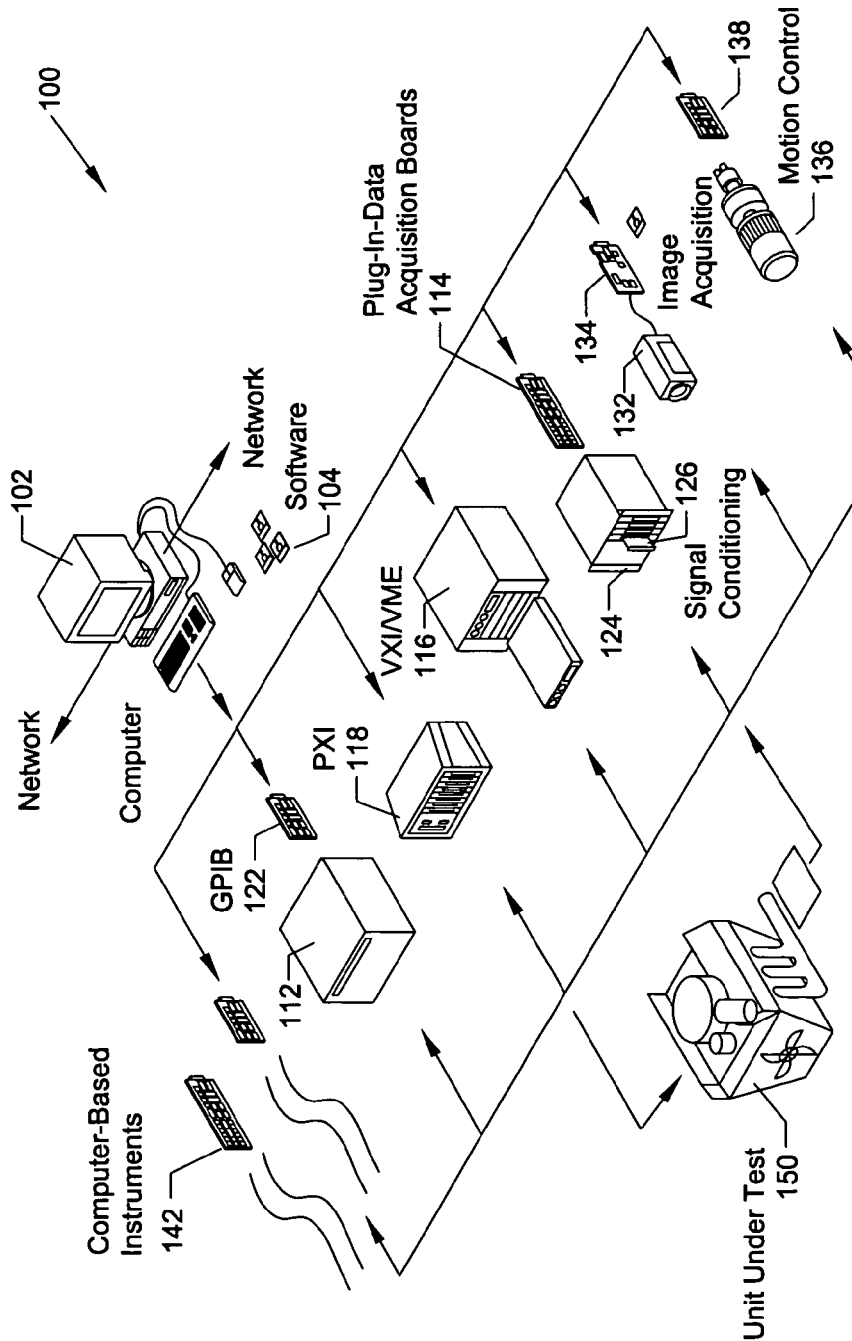
FIGS. 1A and 1B illustrate representative instrumentation and process control systems including various I/O interface options.

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION OF THE PREFERRED EMBODIMENTS

Incorporation by Reference

The following reference is hereby incorporated by reference in its entirety as though fully and completely set forth herein:

U.S. patent application Ser. No. 09/587,682 titled "System and Method for Automatically Generating a Graphical Program to Perform an Image Processing Algorithm," filed Jun. 5, 2000, whose inventors were Nicolas Vazquez, Jeffrey L. Kodosky, Ram Kudukoli, Kevin L. Schultz, Dinesh Nair, and Christophe Caltagirone.

Figure 1B:
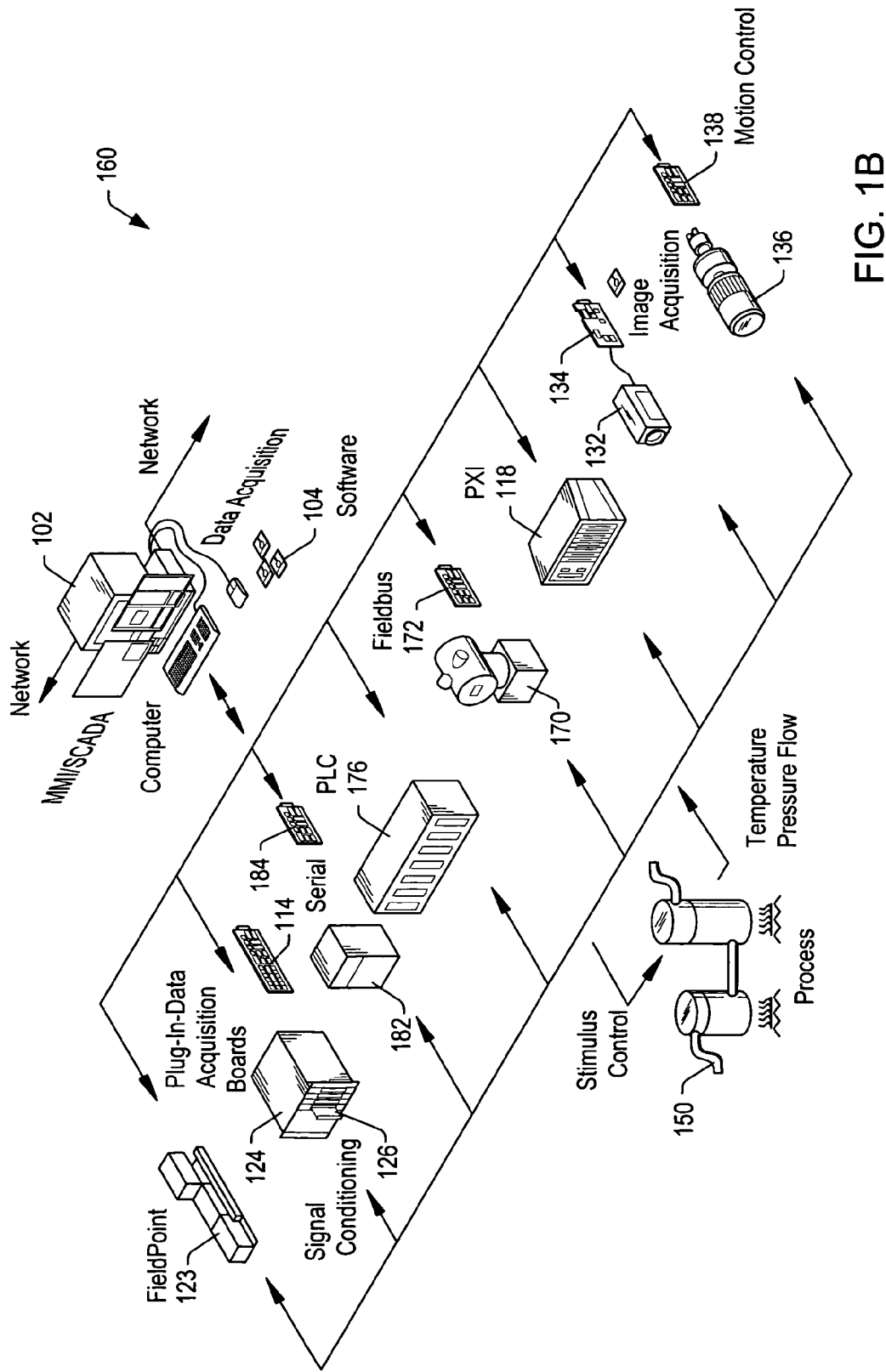

FIGS. 1A and 1B—Instrumentation and Industrial Automation Systems

FIGS. 1A and 1B illustrate exemplary systems which may store or use applications related to image processing. For example, the systems shown in FIGS. 1A and 1B may run an image prototyping environment application operable to develop image processing algorithms in response to user input, and/or the systems may run a program implementing an image processing algorithm developed in such a prototyping environment. Although the preferred embodiment of the present invention is discussed with reference to an image prototyping environment, it is noted that the present invention may also be applied to prototyping environments related to any of various fields or disciplines, such as image analysis, machine vision, process control, automation, test and measurement, simulation, motion control, robotics, audio, video, graphics, telecommunications, and workflow processes, among others. Examples of prototyping environments include IMAQ Vision Builder from National Instruments Corporation, Checkpoint from Cognex Corporation, and IPLab Spectrum from Scanalytic Corporation, among others.

In one embodiment, the systems of FIGS. 1A and 1B may perform an image processing algorithm in real-time, such as a machine-vision algorithm operable to inspect images acquired in real time. In other words, the performance of the image processing algorithm may be important, e.g., so that images may be processed at a required rate. As described below, the present invention comprises a system and method for evaluating the performance of an image processing algorithm, e.g., in order to determine the time requirements of the algorithm and possibly identify portions of the algorithm that need to be modified.

FIG. 1A illustrates an instrumentation control system 100. The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure, or control a unit under test (UUT) or process 150. The host computer 102 may store an image processing prototyping environment application and/or a program implementing an image processing algorithm developed by using such an application, e.g., a program that processes images acquired from the video device 132.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 1B illustrates an exemplary industrial automation system 160. The industrial automation system 160 is similar to the instrumentation or test and measurement system 100 shown in FIG. 1A. Elements which are similar or identical to elements in FIG. 1A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 1B, the computer 102 may store an image processing prototyping environment application and/or a program implementing an image processing algorithm developed by using such an application, e.g., a program that processes images acquired from the video device 132.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system 123 available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 1A and 1B, the computer system 102 preferably includes a memory medium on which one or more computer programs or software components according to the present invention are stored. The term "memory medium" is intended to include an installation medium, e.g., a CD-ROM, floppy disks 104, or tape device, a computer system memory or random access memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

Figure 2:
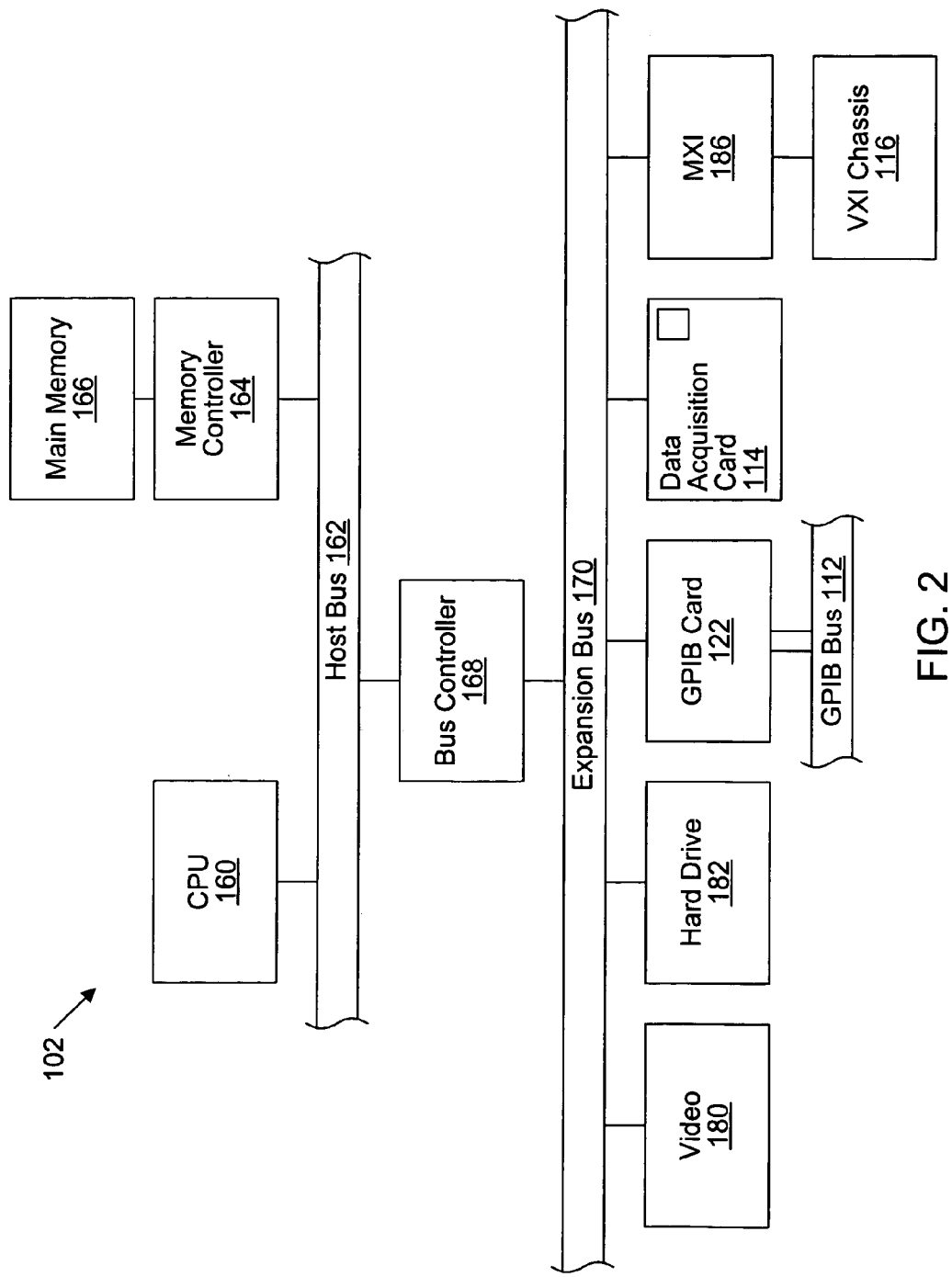
FIG. 2 is a block diagram of the computer system of FIGS. 1A and 1B.

FIG. 2—Computer System Block Diagram

FIG. 2 is a block diagram of the computer system illustrated in FIGS. 1A and 1B. It is noted that any type of computer system configuration or architecture can be used as desired, and FIG. 2 illustrates a representative PC embodiment. It is also noted that the computer system may be a general purpose computer system as shown in FIGS. 1A and 1B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 stores computer programs according to the present invention. The main memory 166 also stores operating system software as well as the software for operation of the computer system, as well known to those skilled in the art. The computer programs of the present invention will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 1A), a GPIB interface card 122 which provides a GPIB bus interface to the GPIB instrument 112 (of FIG. 1A), and a VXI or MXI bus card 186 coupled to the VXI chassis 116 for receiving VXI instruments. The computer 102 further comprises a video display subsystem 180 and hard drive 182 coupled to the expansion bus 170.

Figure 3:
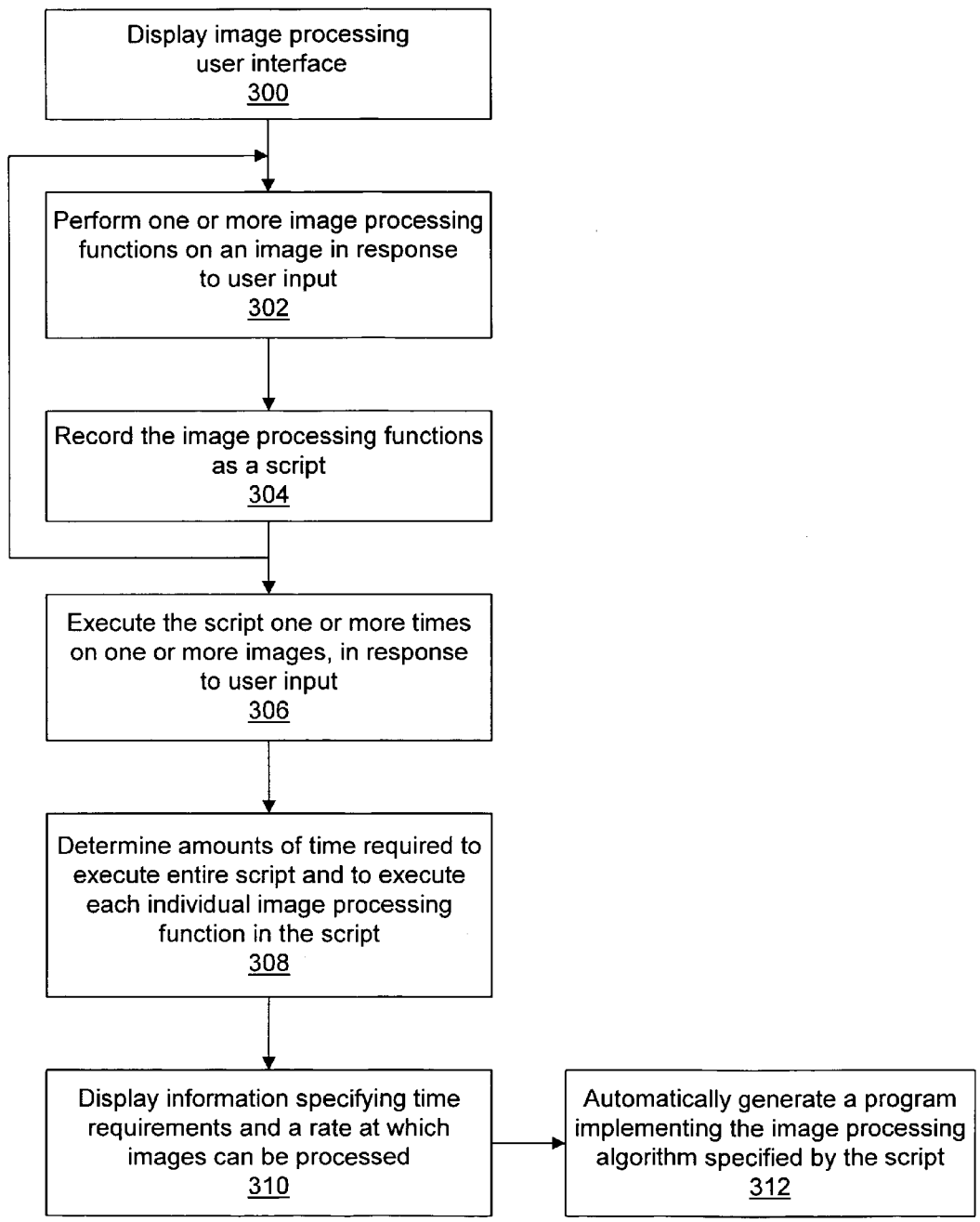
FIG. 3 is a flowchart diagram illustrating one embodiment of a method for creating an image processing algorithm and evaluating the performance of the algorithm.

FIG. 3—Creation and Performance Evaluation of an Image Processing Program

FIG. 3 is a flowchart diagram illustrating one embodiment of a method for creating and evaluating the performance of an image processing algorithm. In step 300, a user interface usable to perform image processing may be displayed. For example, the user interface displayed may be a user interface for an image prototyping environment such as described below. The user interface preferably enables a user to load and display an image, e.g., an image from a file or acquired from hardware device.

In step 302, one or more image processing functions are performed on an image, in response to user input accepted via the user interface displayed in step 300. Exemplary image processing functions are discussed below. The user interface may enable a user to select and apply these functions in any of various ways, e.g., by utilizing a menu, list, palette, etc. As the image processing functions are performed on the image, the user interface may update the image or display a separate resulting image.

As shown in step 304, the image processing functions performed in step 302 may be recorded as a script. This script may specify steps for an image processing algorithm that may be applied to various images. The script may be created automatically in response to the user's actions of applying the image processing functions to the image, or the user may provide input requesting each desired function to be added to the script. For example, the user may first apply a given image processing function to the image, in order to see the results before adding the function to the script. The user interface may enable the user to easily modify or analyze the script by adding or removing steps, performing undo operations, moving to a particular place in the script and displaying the image accordingly, etc.

It is noted that the image processing functions that are recorded in the script are not necessarily performed in step 302. In other words, a user may simply specify an image processing function to be added to the script without actually applying the function to an image.

In step 306, the script developed in steps 302 and 304 may be executed in response to user input. The user may specify one or more images on which to execute the script. Executing the script may comprise executing executable code associated with each of the recorded image processing functions. For example, when creating the script, the user may interactively specify each image processing function, and in response the image processing function may be performed, as described above. Performing each image processing function may comprise executing executable code associated with the function. In step 306, executable code associated with each of the image processing functions in the script may be executed, e.g., in response to a user command to execute the script.

In step 308, an amount of time required to execute the entire script, i.e., to perform the image processing algorithm specified by the script, may be determined. Amounts of time required to execute each individual image processing function in the script may also be determined. For example, step 308 may comprise timing the execution in step 306 of the executable code associated with each of the image processing functions.

As noted above, the user may specify one or more images on which to execute the script. Thus, the time requirements may be based on an average amount of time required for executing the image processing algorithm on various images. For example, different images may have different features which take more time to process. Also, in step 306, the user may specify a desired number of times to execute the script, and the time requirements may be based on an average of the times required for each repetition. For example, various hardware or software events may cause minor fluctuations in the time requirements determined for an individual repetition, and executing the script multiple times may account for these fluctuations.

In step 310, the time requirements determined in step 308 of the entire image processing algorithm and/or of the individual image processing functions in the algorithm may be displayed. A rate at which images can be processed by the algorithm may also be displayed. For example, if the image processing algorithm takes 488 milliseconds to execute, a frame rate of 2.05 frames per second ((1000 ms/sec)/(488 ms/frame)) may be displayed. This information may be required, for example, in order to determine whether the image processing algorithm is fast enough to evaluate images that are acquired at a particular rate in a real-time application. The information may also help the user identify portions of the algorithm that need to be modified, e.g., because they are bottlenecks in the algorithm. For example, the user may change parameters associated with various image processing functions in the algorithm, in order to reduce the execution time of the image processing functions.

It is noted that in one embodiment the image prototyping environment may automatically or programmatically generate and display suggested changes in the algorithm, e.g., in response to user input specifying desired execution time criteria. For example, the prototyping environment may suggest changes to parameters in various image processing functions or may suggest an alternative sequence of steps to replace existing steps. As an example, consider an algorithm including a step that computes a histogram of the image pixels. It may be possible to reduce the execution time of the histogram step by computing the histogram based on only a subset of pixels in the image instead of all the pixels. Thus parameters regarding the pixels to use in computing the histogram may be altered. In one embodiment, the prototyping environment may automatically make changes to the algorithm and inform the user of the changes, e.g., to enable the user to easily execute the changed algorithm to see the results. In this case, the user preferably can request the prototyping environment to automatically undo the changes made.

Various other types of information may also be displayed in step 310. For example, information indicating memory requirements for various functions may be displayed. (Collecting this memory information may affect the execution performance of the algorithm. Thus, the user may be able to disable this feature.) Also, if the image processing algorithm was executed multiple times, then statistical information regarding the execution iterations may be displayed, such as the number of iterations, the minimum, maximum, and average time requirements for the entire algorithm and/or for the individual image processing functions in the algorithm, etc. For example, time information corresponding to each execution iteration may be shown in a tabular display that enables the user to view all or parts of the information, sort the information by different categories, etc.

Information regarding various general image processing categories may also be displayed. For example, the total time requirements for each function in the algorithm related to morphology operations may be summed and displayed as one category. Another category may relate to the total time requirements for steps involved with manipulating color information of the image. Other examples of possible categories include steps related to filtering functions, steps related to histogram functions, steps related to pattern matching functions, etc. In various embodiments, the categories may be separated into any level of granularity as desired and may be customized by the user.

In one embodiment, a program implementing the image processing algorithm specified by the script may then be automatically generated in response to a user request, as shown in step 312. For example, if the user decides that the image processing algorithm is sufficiently fast, the user may then request the image processing algorithm to be included in a standalone executable program. Otherwise, the user may repeat various of the steps above until the efficiency of the algorithm is improved.

In various embodiments, different types of programs, including text-based and graphical programs, may be created. As described below, the program associated with the displayed user interface may interact with another program, e.g., a graphical program development environment application, in order to create the program implementing the image processing algorithm. One embodiment of creating a graphical program in this way is described below.

It is noted that in another embodiment, the script created by the image prototyping environment may itself be an executable computer program operable to execute outside of the image prototyping environment. In this case, step 312 would not be necessary.

As noted above, FIG. 3 represents one embodiment of a method for automatically generating an image processing program, and various steps may be combined, omitted, added, reordered, or modified as desired.

FIGS. 4–14: Prototyping Environment User Interface

Figure 4:
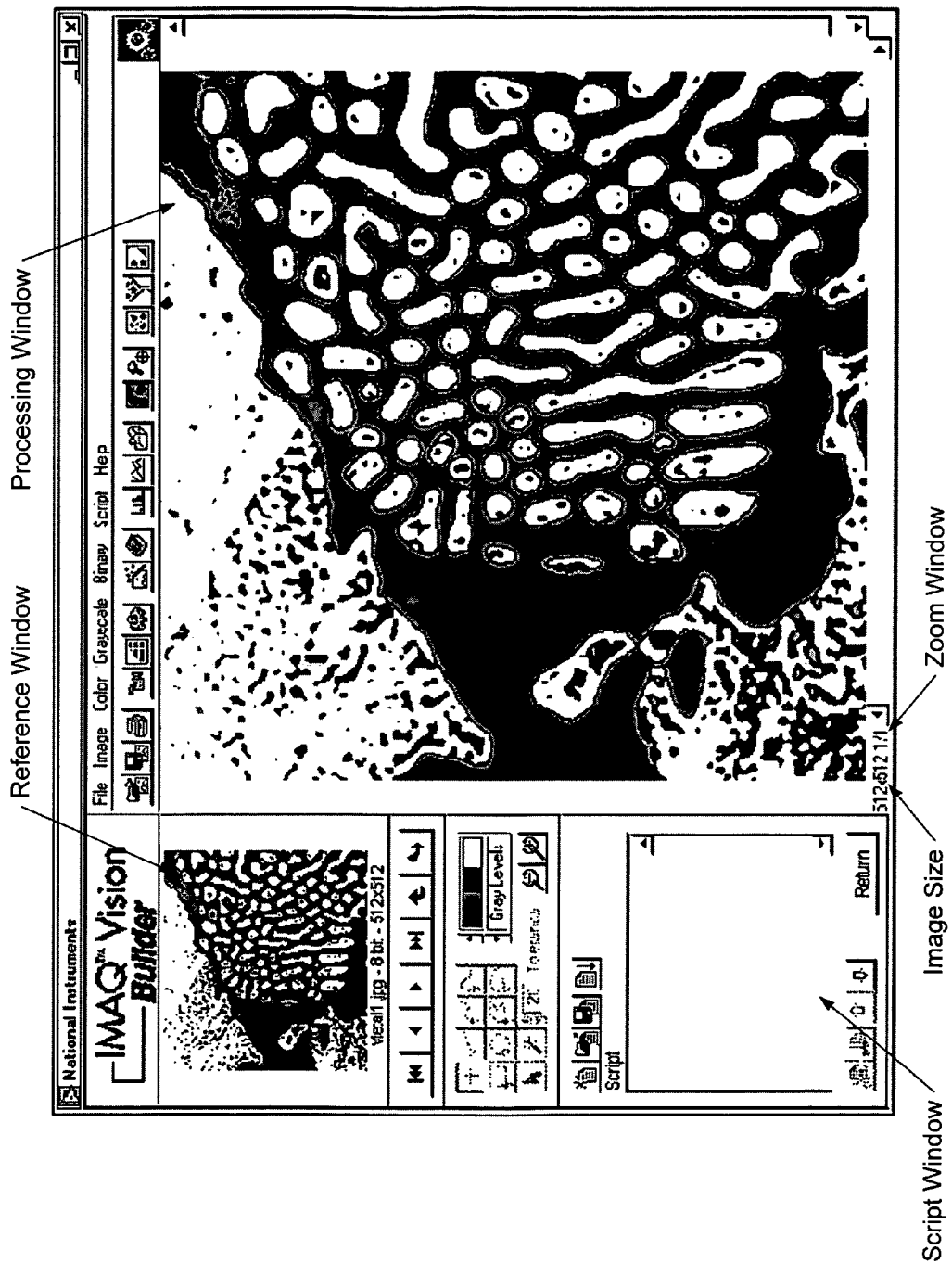
FIG. 4 illustrates an exemplary user interface for an image prototyping environment.

FIG. 4 illustrates an exemplary user interface for an image prototyping environment application. The prototyping environment may enable a user to easily load an image and quickly apply various image processing functions or operations to the image, immediately seeing the results. The image processing operations selected and applied by the user are preferably recorded as a script. The script may then be run in order to evaluate the image processing algorithm specified by the script. After running the script, the user may edit the script to improve the performance of the algorithm if necessary. In one embodiment, once the desired image processing algorithm has been developed, the prototyping environment may then automatically create a standalone program in response to the script, i.e., to implement the algorithm comprised in the script.

In various embodiments, the image prototyping environment may be operable to load and manipulate any of various types of images, including gray-level and color images. The prototyping environment may also support complex images in which pixel values have a real part and an imaginary part. The images may be obtained from any of various sources. The images may, for example, be obtained from an image file, such as a BMP, TIFF, AIPD, PNG, JPG, or GIF file, or a file formatted according to another image format. The images may also be obtained from a hardware device, such as a camera. For example, images may be obtained from a device such as the video device 132 illustrated in FIGS. 1A and 1B, or from any of various other types of devices, including digital cameras, framegrabbers, etc.

The prototyping environment may support any of various image processing functions or operations. As used herein, the term "image processing" may include image processing, image analysis, and machine vision functions or operations, among others.

Image processing functions for processing an image may include functions such as:
  filtering functions for smoothing, edge detection, convolution, etc.
  morphology functions for modifying the shape of objects in an image, including erosion, dilation, opening, closing, etc.
  thresholding functions for selecting ranges of pixel values in grayscale and color images
  particle filtering functions to filter objects based on shape measurements The term "image processing" may also include functions for performing various types of image analysis, including:
  a histogram function that counts the total number of pixels in each grayscale value and graphs it
  a line profile function that returns the grayscale values of the pixels along a line drawn through the image with a line tool and graphs the values
  particle analysis functions that computes such measurements on objects in an image as their areas and perimeters
  a 3D view function that displays an image using an isometric view in which each pixel from the image source is represented as a column of pixels in the 3D view, where the pixel value corresponds to the altitude.

The term "image processing" may also include functions useful in machine vision applications, including:
  an edge detection function that finds edges along a line drawn through the image with a line tool
  a pattern matching function that locates regions of a grayscale image that match a predetermined template
  a shape matching function that searches for the presence of a shape in a binary image and specifies the location of each matching shape
  a caliper function that computes measurements such as distances, areas, and angles based on results returned from other image processing functions
  a color matching function that quantifies which colors and how much of each color exist in a region of an image and uses this information to check if another image contains the same colors in the same ratio It is noted that the image processing functions listed above are exemplary only and that, in various embodiments of the image prototyping environment, other types of image processing functions or operations may be supported.

The user interface of the prototyping environment may enable the user to load or select an image and easily select image processing functions to apply to the image. One element illustrated in FIG. 4 is labeled as a "reference window". FIG. 4 also illustrates a "processing window". As the user applies various image processing functions to the loaded image, the processing window may display the resulting image, while the reference window displays the original unmodified image. The user may select an image processing function to apply by choosing the desired function from a menu bar or by clicking on an icon, etc.

The user interface of FIG. 4 also illustrates a "script window". Each image processing function that the user applies to the image may be displayed in this script window. The image processing operations that a user applies to an image may result in a script of image processing operations specifying an algorithm that can be applied to analyze or manipulate other images. As an example, FIGS. 5–11 illustrate a process of developing an image processing script useful for "blob analysis".

A "blob" (Binary Large OBject) is a connected region or grouping of pixels in an image in which all pixels have the same intensity level. In a binary image, the background is zero, and every non-zero pixel is part of a binary object. Finding the size, number, or location of blob regions in an image may be useful for many applications, such as detecting flaws on silicon wafers, detecting soldering defects on electronic boards, locating objects in motion control applications, etc.

Figure 5:
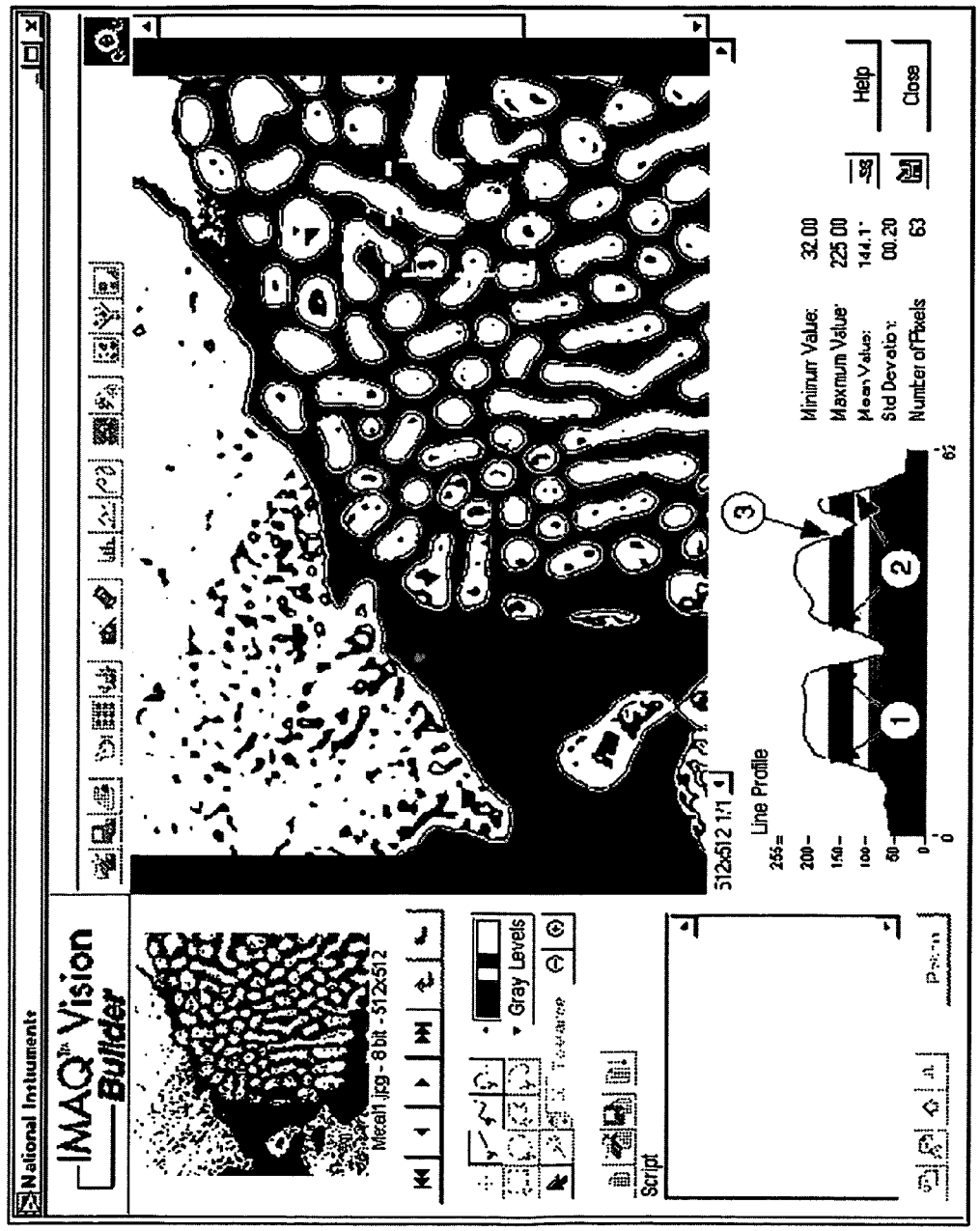
FIGS. 5–11 are screen shots illustrating a process of developing an image processing script useful for "blob analysis"

FIG. 5 illustrates an image for which the user desires to perform blob analysis. In FIG. 5, the user has selected a line profile tool and has drawn a straight line through a portion of the image in the processing window. A rectangle in the processing window indicates the location of this line. In response, the prototyping environment displays grayscale values of the line drawn with the line profile tool, such as the minimum and maximum pixel values, in the bottom of the window. Note that details regarding the image processing functions applied in FIGS. 5–11 are omitted. For background information on image processing in general or the particular image processing functions referred to herein, please refer to available literature, such as the *IMAQ Vision User Manual,* available from National Instruments Corporation.

Figure 6:
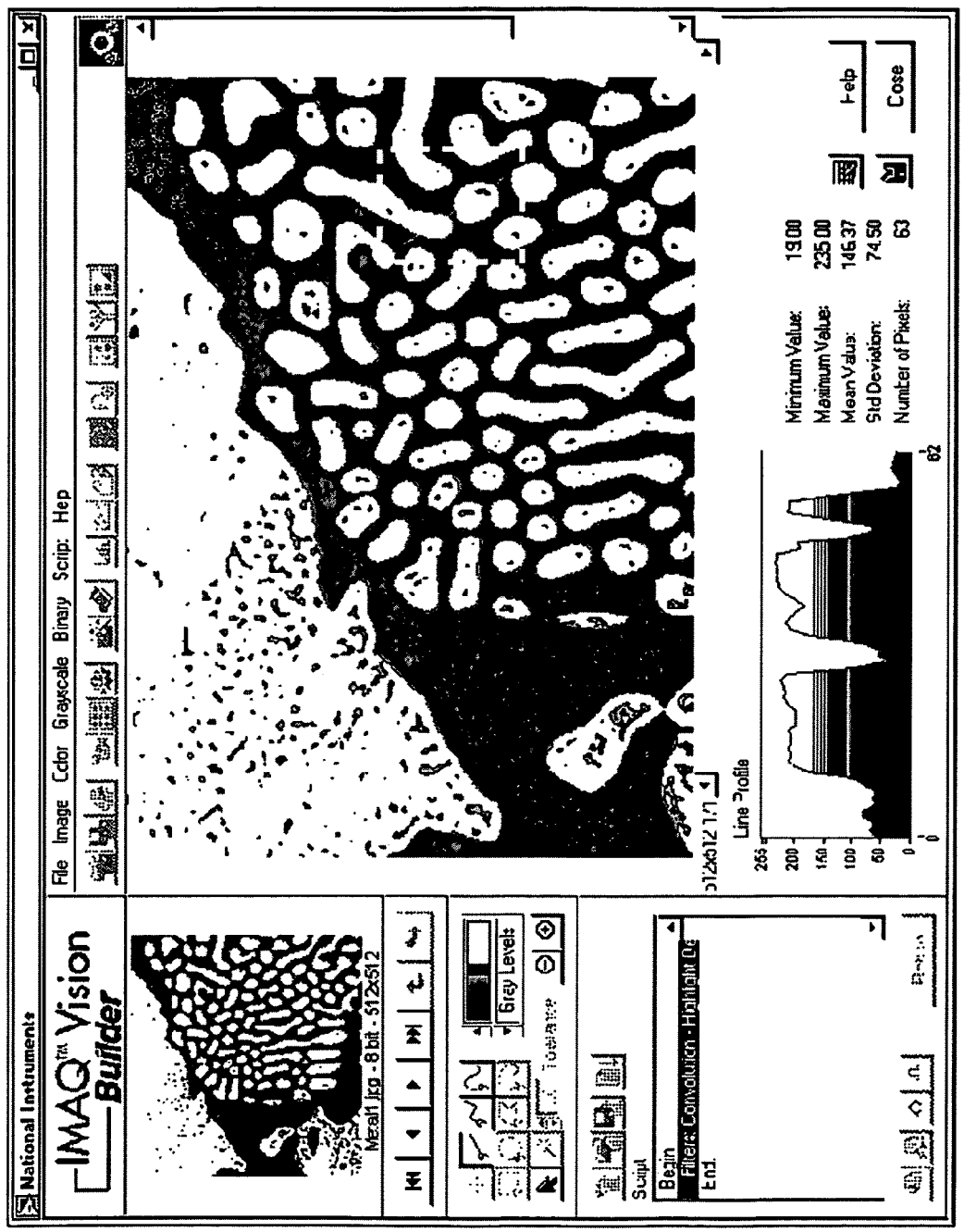

Based on the line profile grayscale values shown in FIG. 5, the user may then apply a filter to the image, e.g., to sharpen edges in the image and to create contrast between the particles and the background. The prototyping environment may provide various types of filters that may be applied, e.g., by selecting the desired filter from a menu bar. FIG. 6 illustrates the resulting image after the user has applied a "Convolution-Highlight Details" filter to the original image. Due to this filter operation, the FIG. 6 image appears to be sharper than the original image. Note that the filtering operation the user applied is recorded in the script window of FIG. 6. Note also that the grayscale values of a line drawn with the line profile tool have changed from the values shown in FIG. 5.

The next step the user may want to perform in the blob analysis is a thresholding operation to separate the particles from the background. A thresholding operation converts the grayscale image to a binary image, keeping the pixels of interest and removing the remaining pixels. The FIG. 7 processing window illustrates the results of applying a thresholding operation in which pixels with a value of 130 to 255 are kept and other pixels are removed. The thresholding operation applied to the image is recorded in the script window of FIG. 7.

It is noted that for each type of image processing function supported, the prototyping environment may be operable to display intermediate windows or screens that the user interacts with. These intermediate windows or screens may enable the user to specify various parameters or settings that apply to a particular image processing function. When the image processing function is added to the script, the specified parameters may be associated with the image processing function. The parameters may then be used in generating a program to implement the image processing algorithm, as described below. It is noted that various image processing functions may have output parameters as well as input parameters.

The process of developing an image processing algorithm may typically involve experimenting with various image processing functions and settings for the functions. However, FIGS. 5–11 omit such intermediate states and simply illustrate the result of applying each step in the algorithm to the image. For example, when performing a threshold operation, an intermediate screen such as shown in FIG. 8 may appear. FIG. 8 illustrates a selection box enabling the user to select the particular type of threshold operation to apply and illustrates an interactive graph with minimum and maximum threshold values that the user may adjust in order to find the desired threshold pixel values to use. When the threshold operation step is added to the script, the specified minimum and maximum values may be associated with the step.

Figure 7:
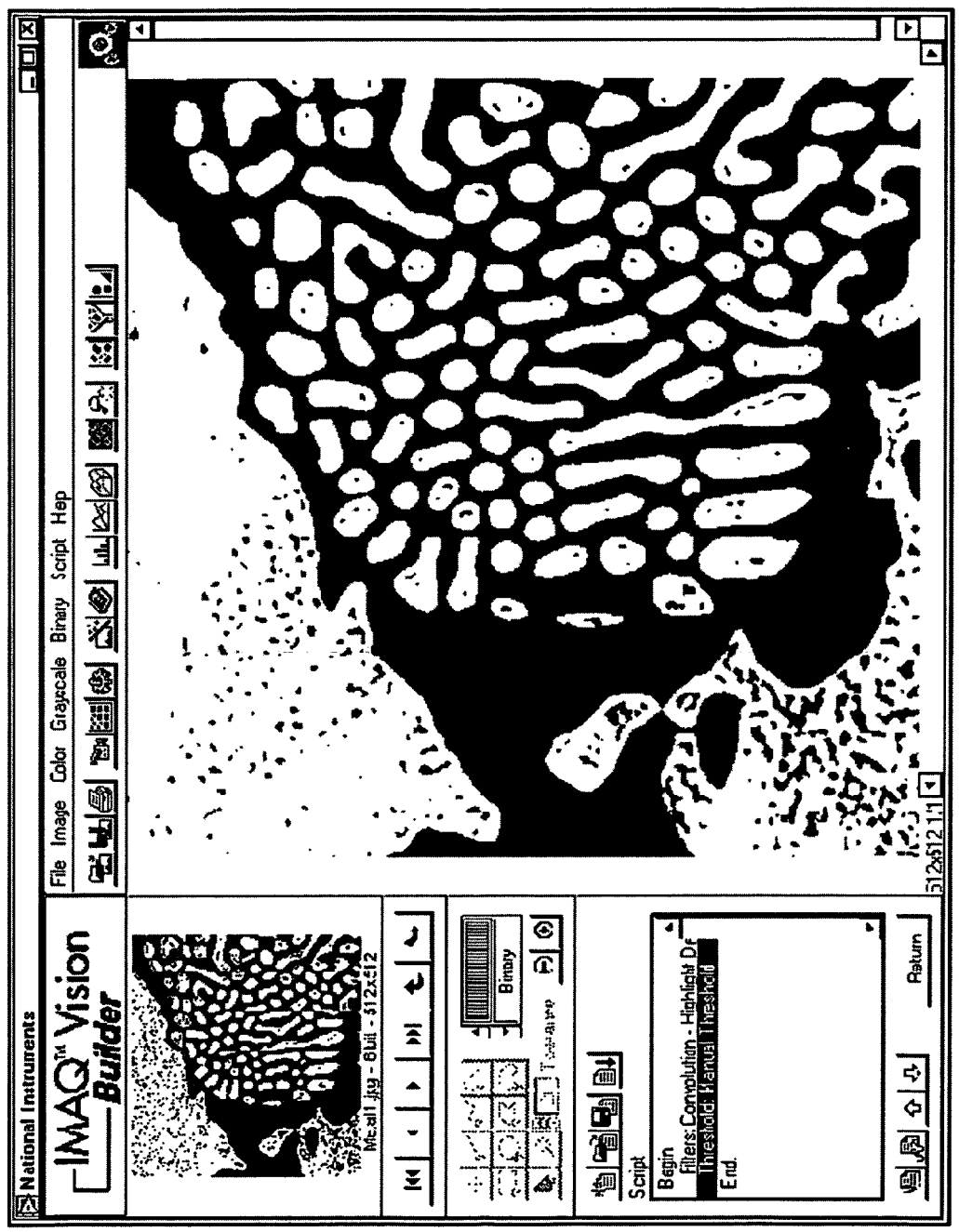
Figure 8:
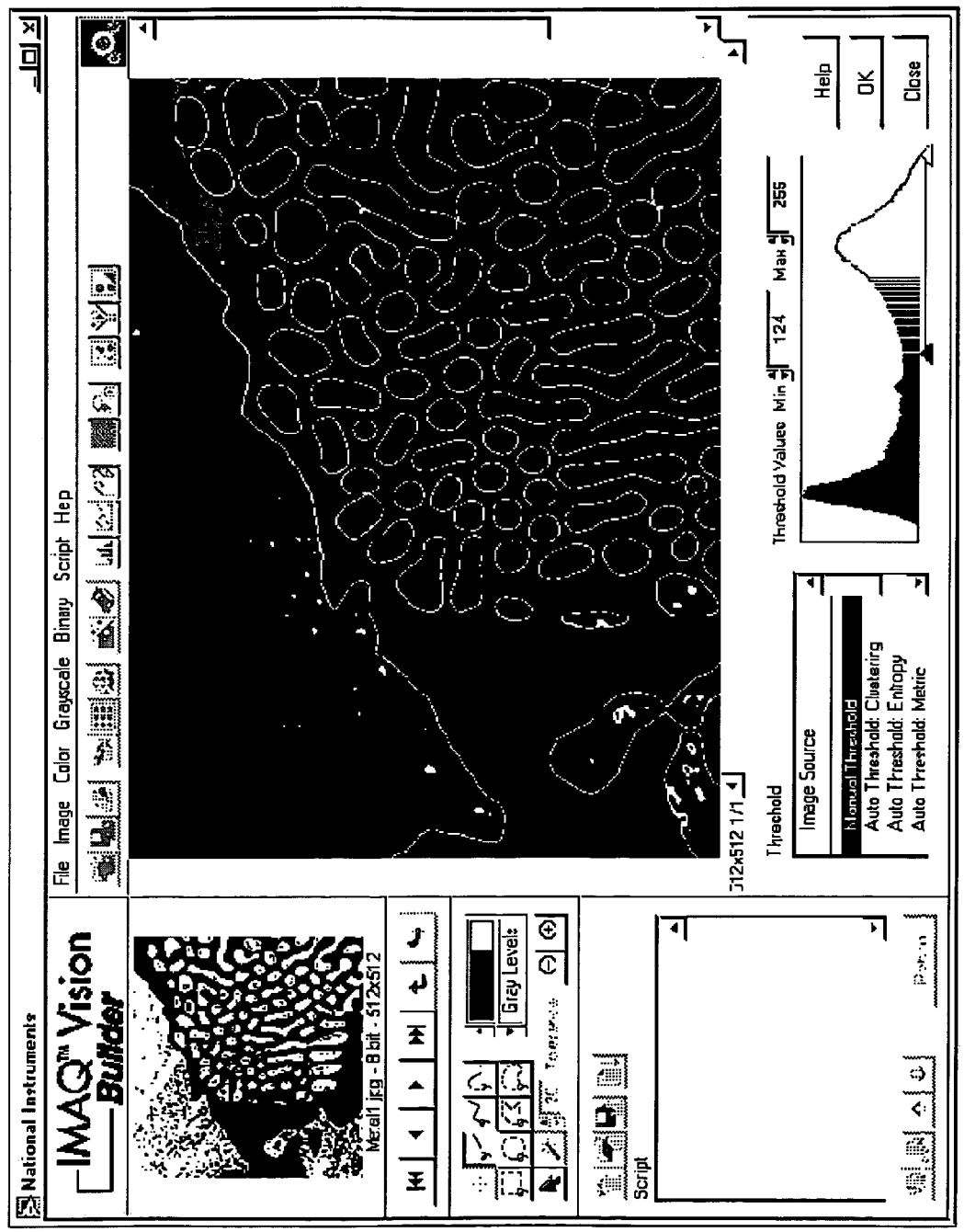
Figure 9:
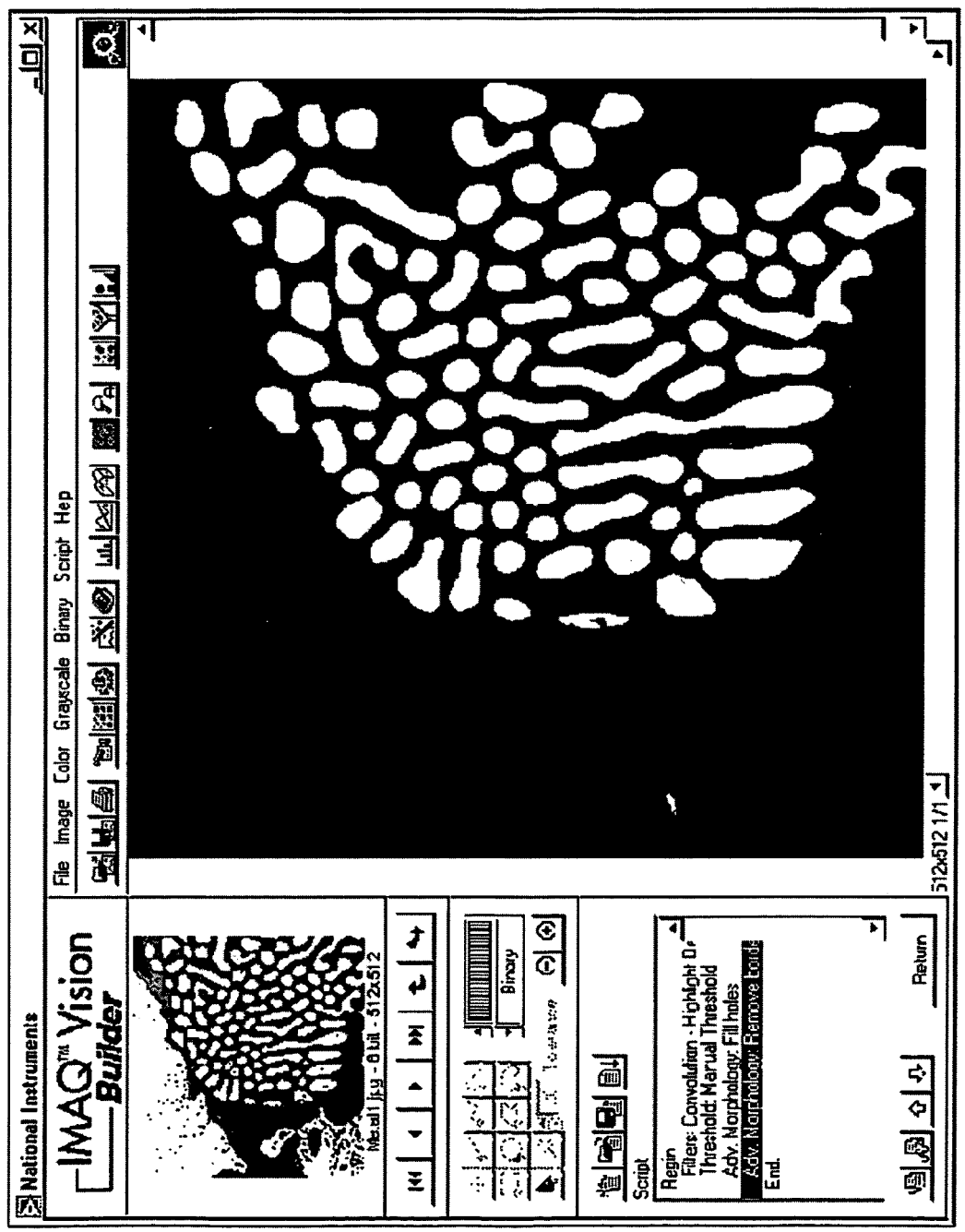
Figure 10:
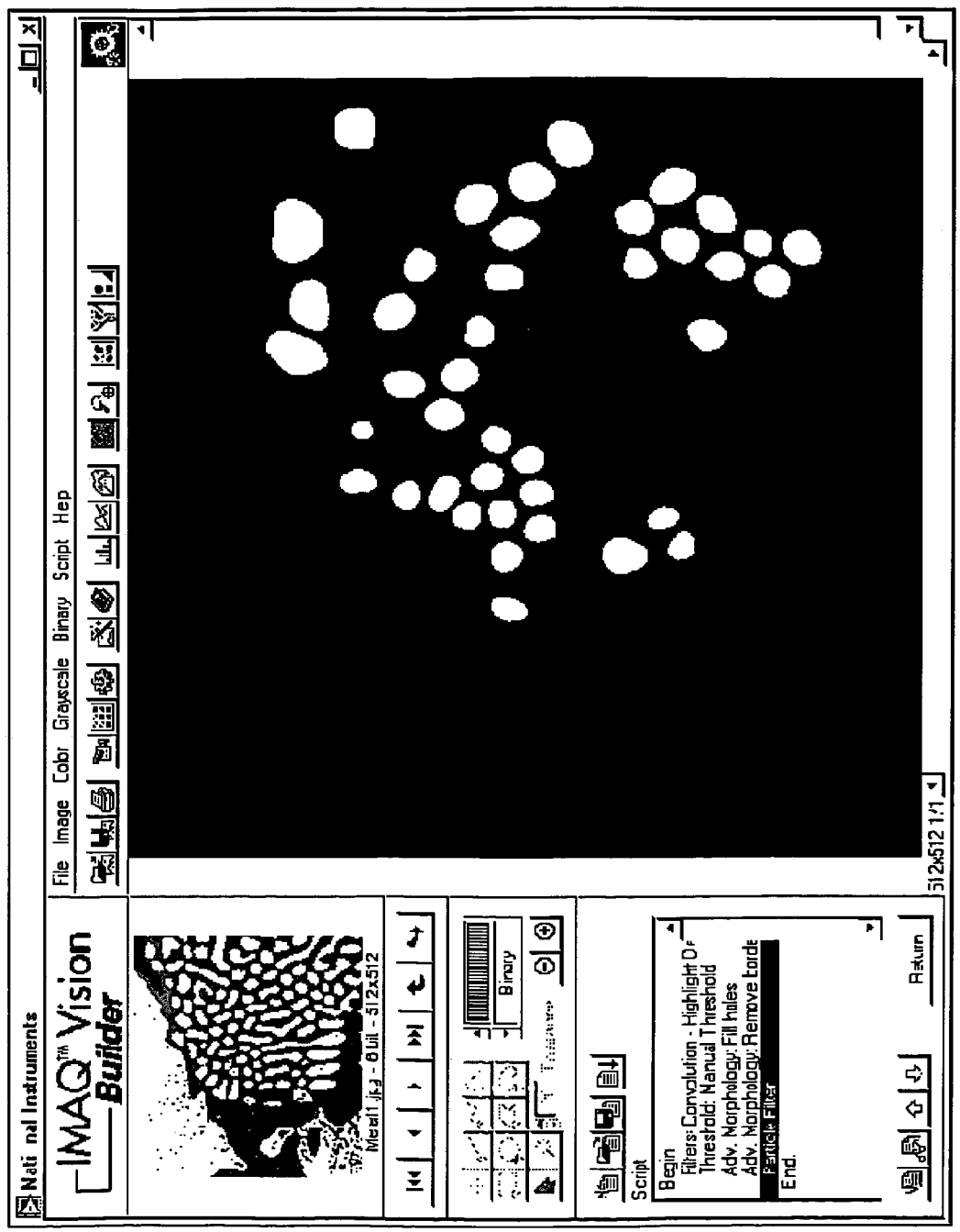

Continuing with the blob analysis example, after the thresholding operation is applied, the FIG. 7 binary image is obtained. The FIG. 7 particles are referred to as blobs. The user may then apply morphological functions to the image, where the morphological functions affect each blob on an individual basis. The FIG. 9 processing window illustrates the results of applying two successive morphological functions to the image: a "Fill Holes" function to fill holes in the particles, and a "Remove Border Objects" function to remove objects that touch the border of the image. These morphological functions are also displayed in the FIG. 9 script window.

The user may next want to apply a particle filter function which isolates and keeps the circular blobs and removes the non-circular blobs from the image. The FIG. 10 processing window illustrates the results of applying such a particle filter. The particle filter operation is displayed in the FIG. 10 script window.

Figure 11:
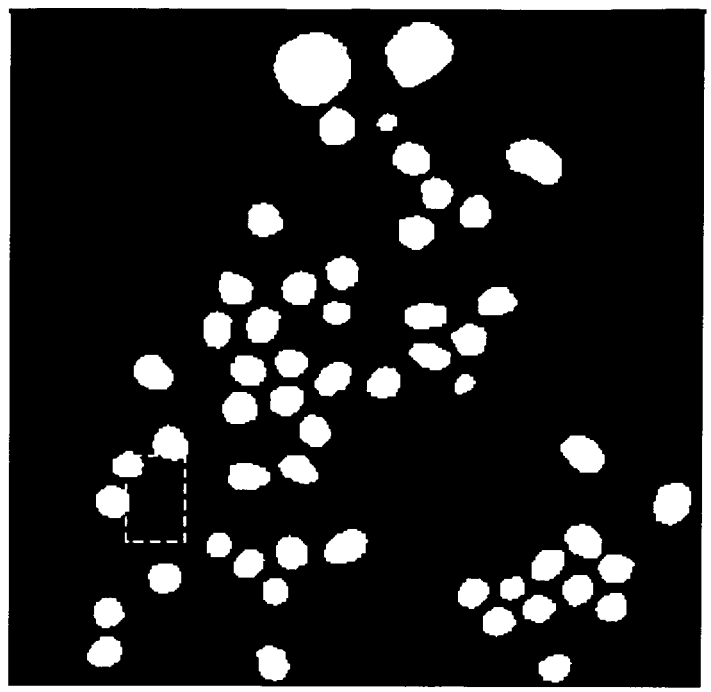
Figure 11:
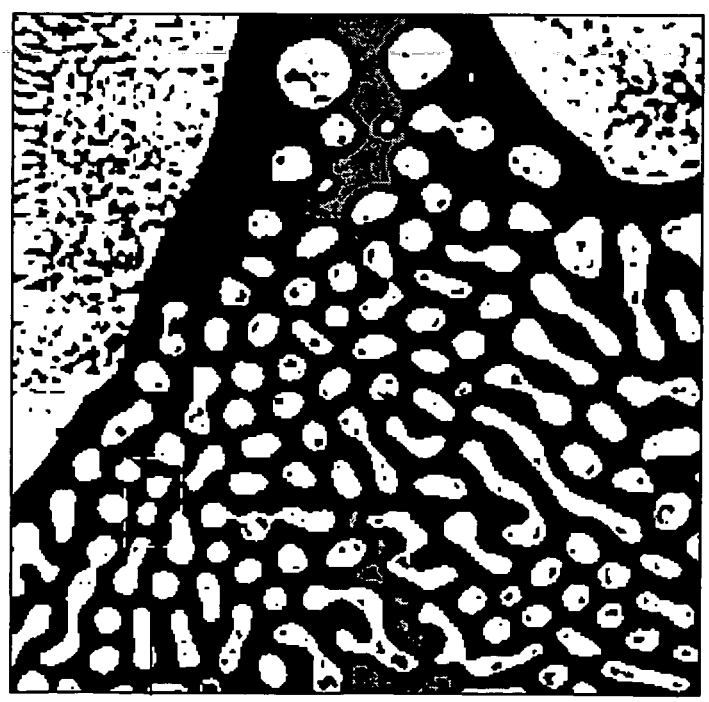

Once the user has developed the desired image processing algorithm in the prototyping environment, the user may test the algorithm on other images. As described above, a script describing each step of the algorithm may be recorded, and the prototyping environment may be operable to run this script on other images. For example, FIG. 11 illustrates an original image (Metal3.jpg) and the image that results from applying the script described above for FIGS. 5–10. Notice that the resulting image is similar to the FIG. 10 result, in which circular blobs are isolated. Of course, the blob analysis algorithm discussed above is exemplary only, and image processing algorithms to perform any of various other types of image processing, manipulations, or analyses may be developed.

When running the script, the prototyping environment is preferably operable to determine the time requirements of the image processing algorithm and of the individual image processing functions defining the algorithm, as described above with reference to FIG. 3. FIGS. 12–14 illustrate exemplary user interface windows related to the execution performance of the algorithm that the prototyping environment may display. FIG. 12 illustrates a status bar that may be displayed while the image processing algorithm is running in order to inform the user that the algorithm performance is being evaluated. FIG. 13 illustrates a window including an indicator that shows the performance of the algorithm as a whole, in terms of the number of frames or images per second that the algorithm can process. This window also shows the time in milliseconds required for the image processing algorithm to run. By clicking on the button labeled "Details," the user can also view the time requirements of the individual image processing functions, which are shown in FIG. 14.

In the example results shown in FIG. 14, the "Filter Convolution" step is the most expensive step, in terms of processing time. Thus, if desired, the user can attempt to improve this step of the algorithm, e.g., by editing parameters associated with this step to increase the efficiency. Also, as described above, in one embodiment, the image prototyping environment may be operable to automatically improve this portion of the algorithm, e.g., by changing parameters of the Filter Convolution step.

FIGS. 15–20: Requesting a Program to be Generated from a Script

Figure 15:
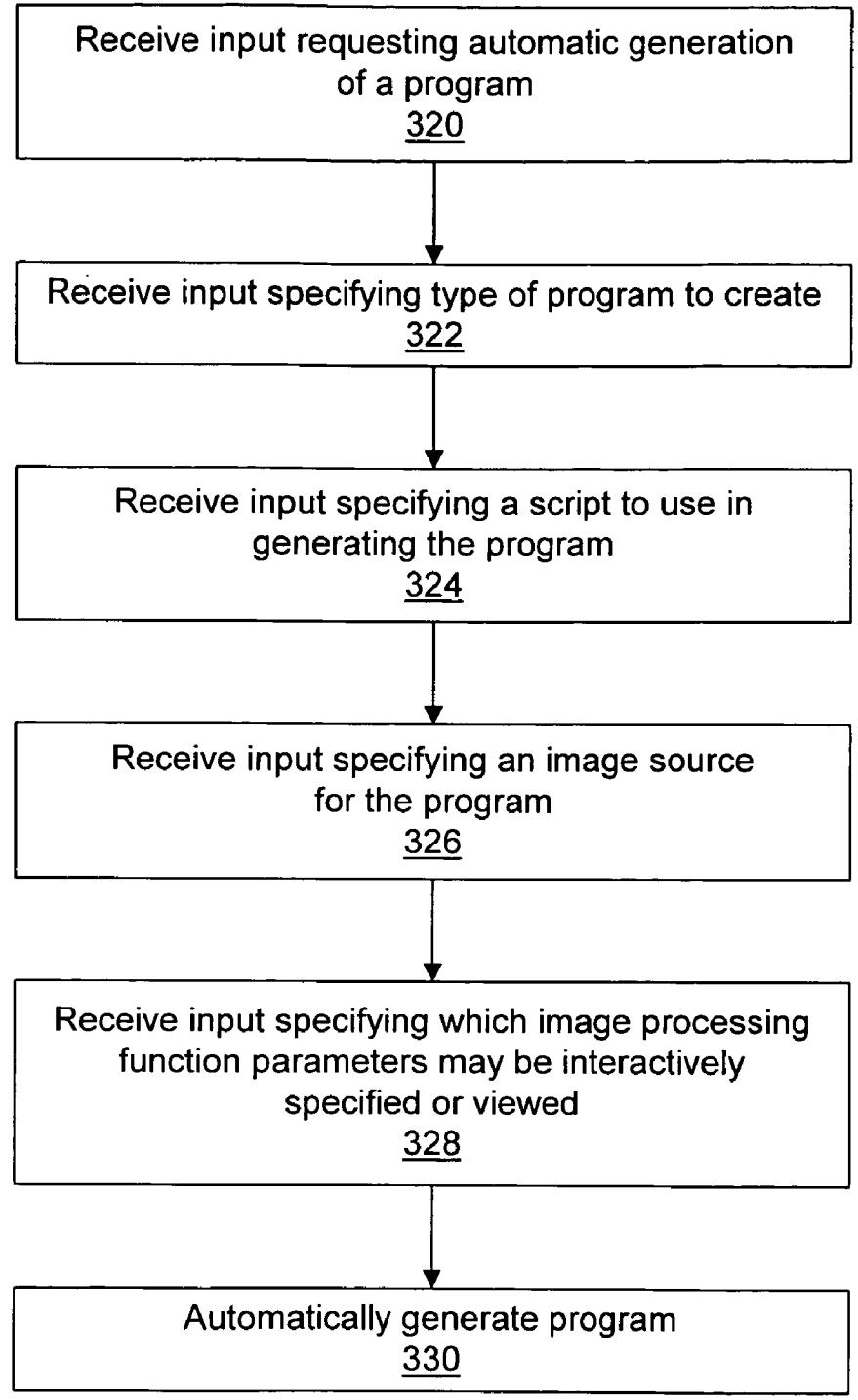
FIG. 15 is a flowchart diagram illustrating one embodiment of a method for receiving information to be used in automatically generating a program.

In the preferred embodiment, once the user has developed and tested an image processing algorithm in the image prototyping environment, the prototyping environment is operable to automatically generate a program to perform the algorithm. FIG. 15 is a flowchart diagram illustrating one embodiment of a method for receiving information to be used in generating the program. In one embodiment, a code generation "wizard", i.e., a series of related user interface dialogs, may be employed to receive the information described in FIG. 15. FIGS. 16–20 illustrate an example of such a code generation wizard.

In step 320 of FIG. 15, input requesting automatic generation of a program is received, e.g., interactively or programmatically. For example, once the user has developed and measured the performance of a script as described above, the user may then issue a command to generate a program from the script.

As described above, in various embodiments, any of various types of programs, including text-based and graphical programs, may be generated to implement the image processing algorithm. In step 322, input specifying a type of program to create may be received. The input received in step 322 may specify a particular programming language to use in generating the program and/or may specify a particular programming development environment where the generated program will be used. Many programming development environments support proprietary dialects of programming languages. If a particular programming development environment is specified in step 322, the generated program may utilize proprietary programming or development features, or may adhere to proprietary requirements.

Figure 16:
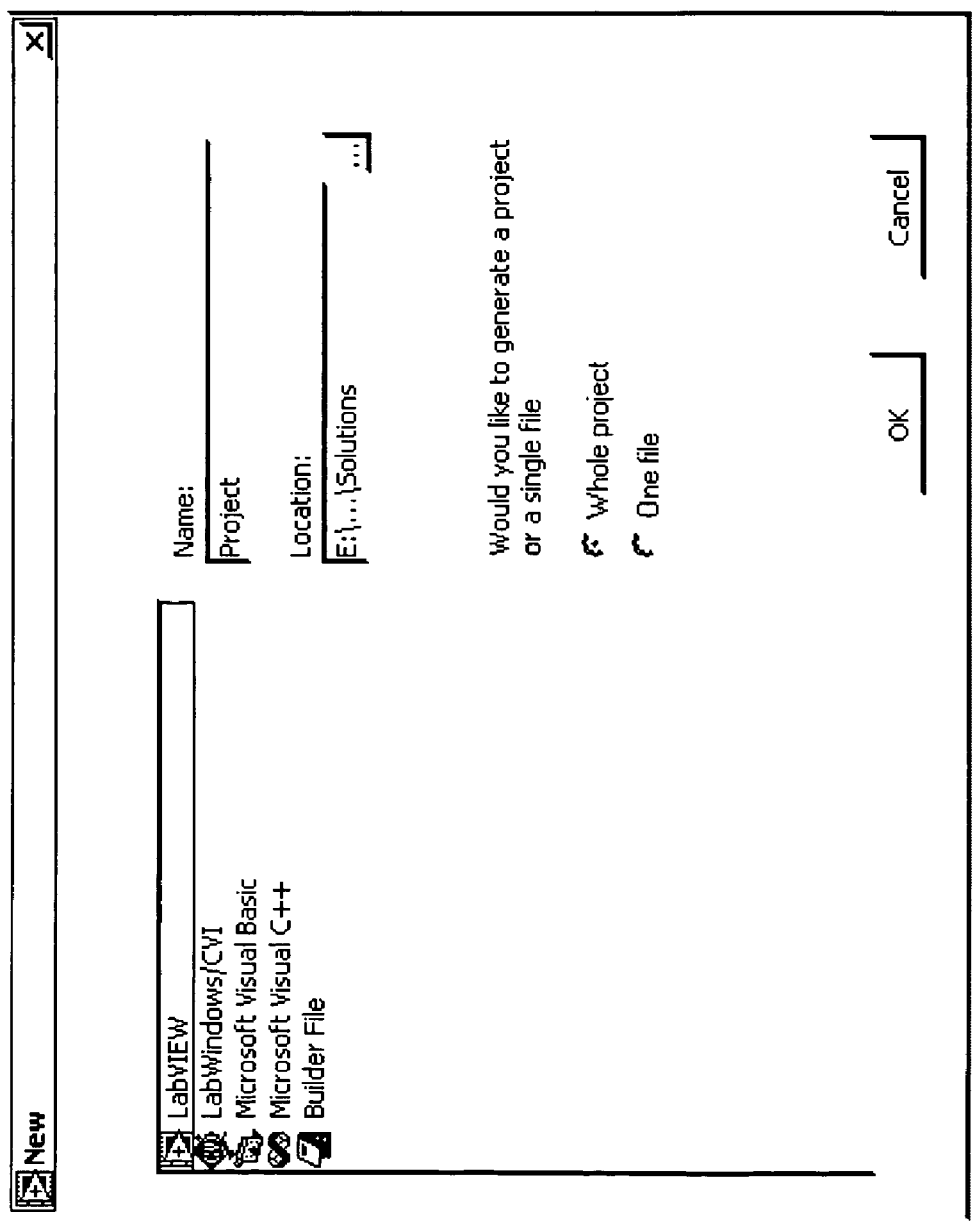
FIG. 16 illustrates a user interface for receiving information specifying a program type to create.

FIG. 16 illustrates a user interface for receiving information specifying a program type to create. A selectable list of various programming development environments is shown. In this example, the list includes a graphical programming development environment, LABVIEW, as well as various text-based programming environments, including LABWINDOWS/CVI, Microsoft VISUAL BASIC, and Microsoft VISUAL C++. In alternative embodiments, any of various other programming languages or development systems may be supported.

As shown in FIG. 16, a user may also specify whether to generate additional files or other elements associated with the generated program. For example, many programming development environments utilize proprietary file types, such as project files that specify information or settings for an application. For an embodiment supporting such programming development environments, the user may specify whether to generate only the file(s) implementing the program or to also generate a project file or other relevant files associated with the program.

Figure 17:
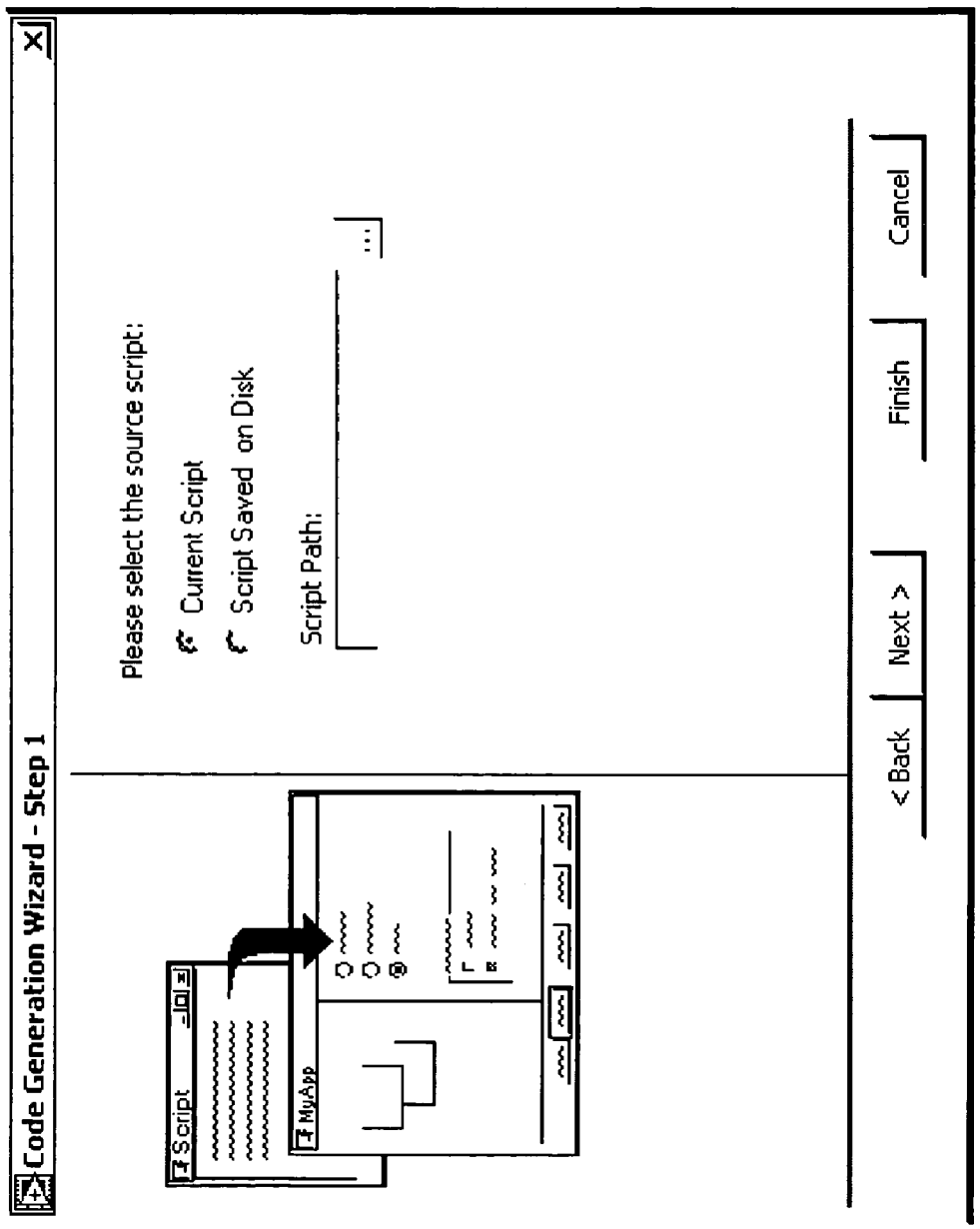
FIG. 17 illustrates a user interface for receiving information specifying a particular script to use in generating a program.

In step 324, input specifying a particular script to use in generating the program may be received. For example, a script developed as described above may be saved to a script file, which is then specified in step 324. Alternatively, a current script, i.e., a script that is currently open or in use, may be specified. FIG. 17 illustrates a user interface for receiving the information of step 324. In one embodiment, the current script is automatically used in generating the program.

Figure 18:
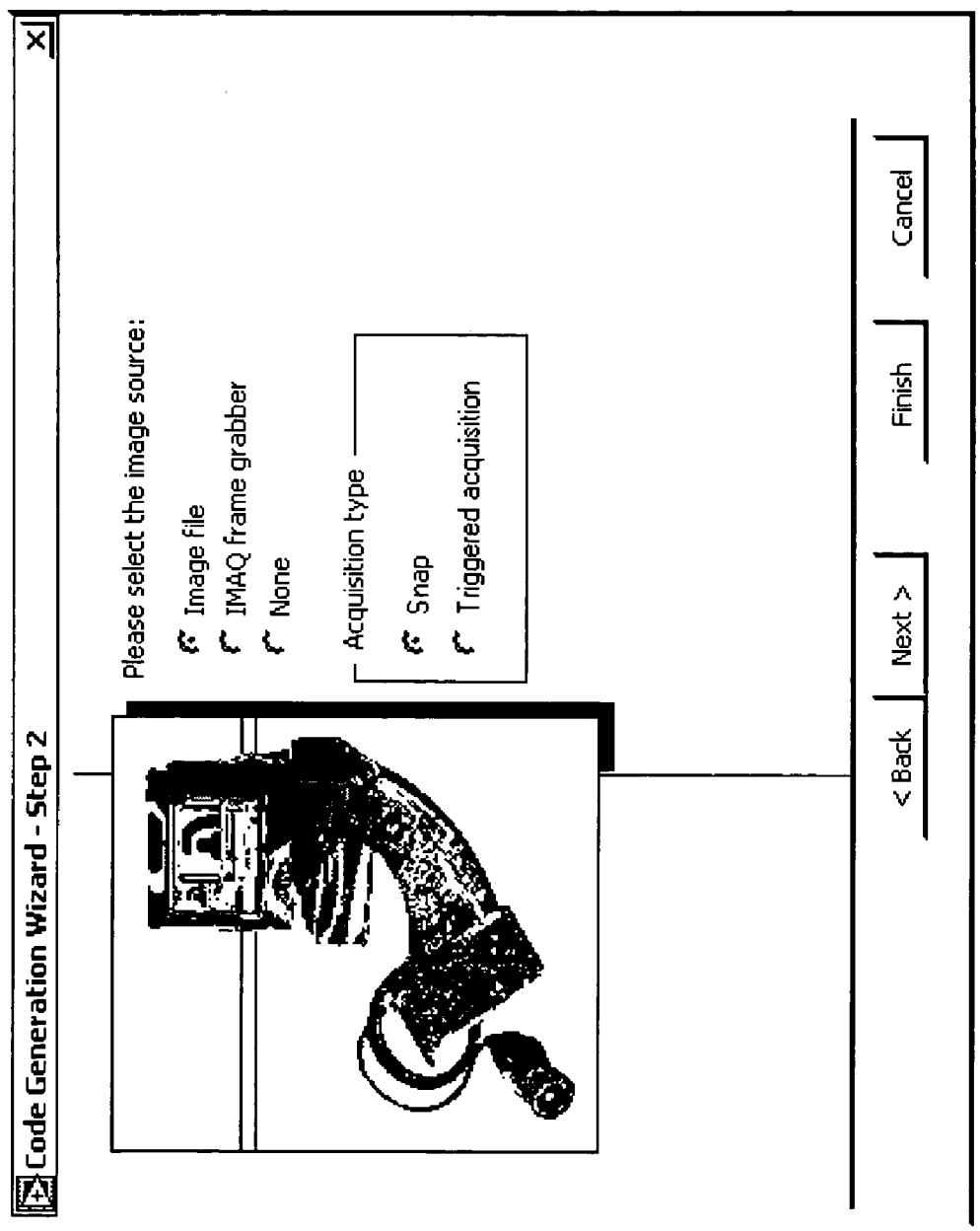
FIG. 18 illustrates a user interface for specifying an image source type for a program.

In step 326, input specifying an image source or type of image source for the program may be received. In one embodiment, the generated program may perform different operations, depending on the type of image source. For example, if the image source is an image file, the program may include code for opening the file, extracting the image from the file, etc. If the image source is a hardware device, the program may include code for initializing the hardware device, acquiring the image from the device, etc. FIG. 18 illustrates an exemplary user interface for specifying an image source type. In this example, either an image file or a framegrabber hardware device may be specified. As shown in FIG. 18, if the image source is a hardware device, various parameters relating to the device, e.g., snap or triggered acquisition may also be specified in step 326.

In step 328, input specifying which image processing function parameters may be interactively specified or viewed may be received. As described above, each particular image processing function may have associated input and/or output parameters or settings. When developing the script, the user may set the input parameter values for each step as desired, and the desired parameter values may be associated with the image processing function when the function is added to the script. The input parameter values may then be used to generate a program that operates as desired. In one embodiment, the parameter values are automatically hard-coded into the program and cannot be changed without modifying the program code. However, the user may desire the ability to interactively change one or more of the input parameter values during program operation and/or view one or more output parameter values. Thus, in the preferred embodiment, the user can specify which input parameter values may be interactively specified or which output parameters may be viewed. The generated program is then operable to accept program input specifying new values for the chosen input parameters during program operation and is operable to provide program output displaying the chosen output parameters. For example, in one embodiment, a graphical user interface panel including various user interface controls and indicators allowing the user to set the input parameter values and view the output parameter values may automatically be displayed when the program executes.

Figure 19:
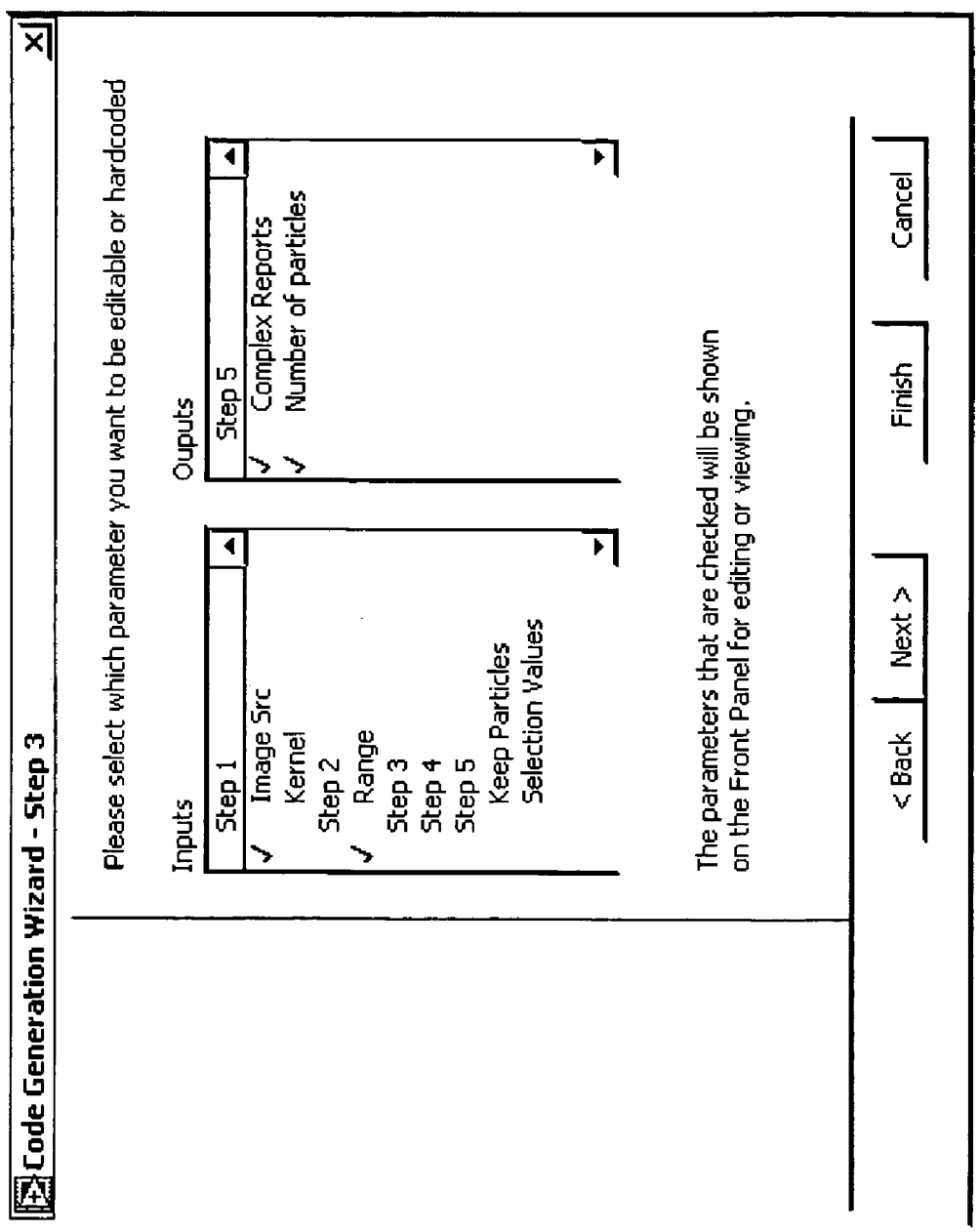
FIG. 19 illustrates a user interface for specifying input and output parameters for a program that are desired to be interactively changeable or viewable.
Figure 23:
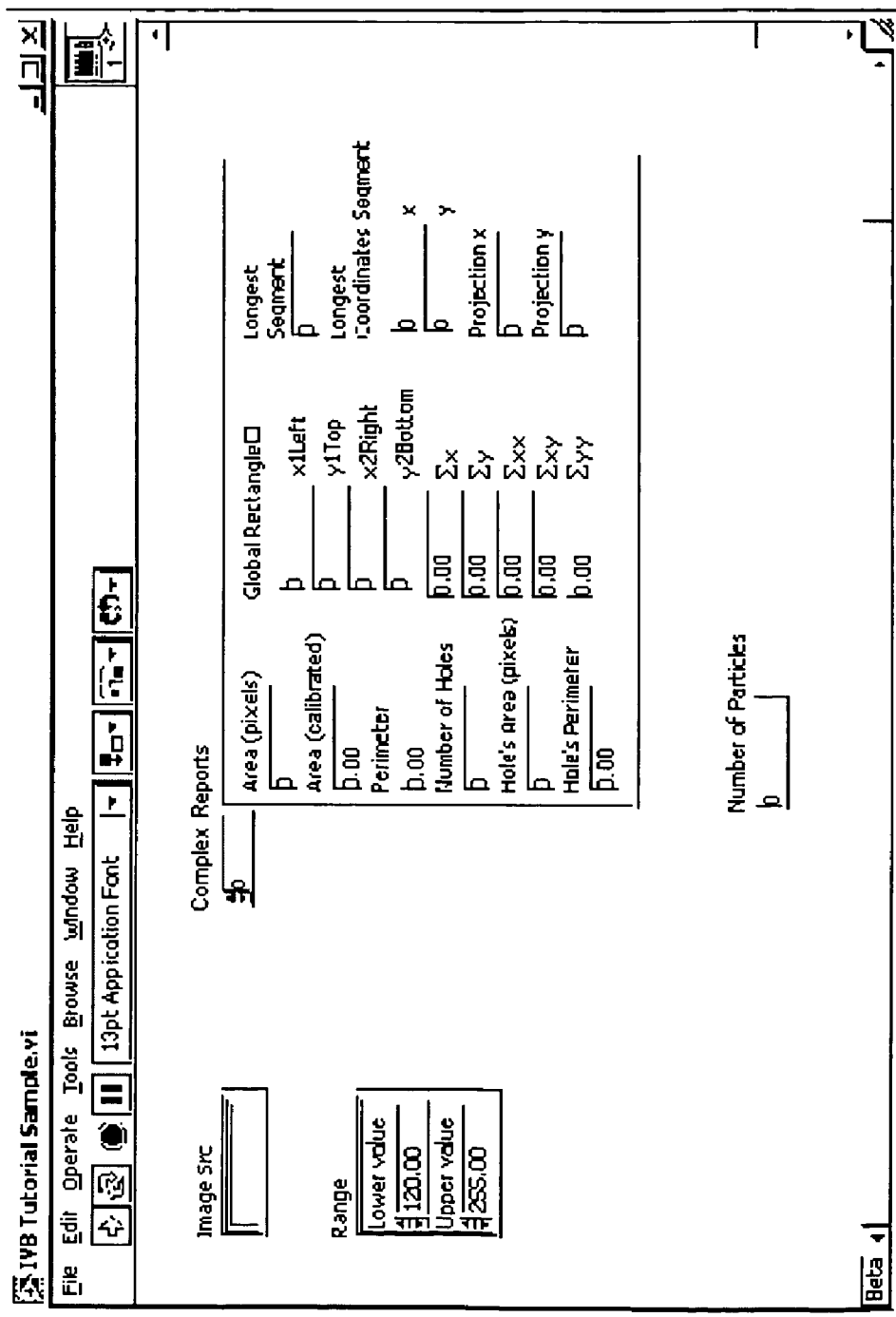
FIG. 23 illustrates a user interface panel including user interface controls and indicators for specifying input parameter values and displaying output parameter values for the graphical program of FIG. 22.

FIG. 19 illustrates a user interface for receiving input specifying the input and output parameters that are desired to be interactively changeable or viewable. The items displayed in FIG. 19 correspond to the final script shown in the script window of FIG. 10. As shown, the user interface may divide the items into input or output parameters and subdivide each group to illustrate which step of the script the items correspond to. For example, as discussed above with reference to FIG. 8, step 2 of the script, a threshold operation, may utilize input parameters specifying minimum and maximum threshold values. The user interface shows an item labeled "Range" which corresponds to these input parameters. The user may place a check beside each input parameter desired to be interactively changeable and beside each output parameter desired to be interactively viewable. FIG. 23, discussed below, illustrates a user interface panel with user interface controls and indicators corresponding to the selected input and output parameters, respectively.

In step 330, the program is automatically generated, using the information received in steps 322–328. Step 330 may be performed in any of various ways as appropriate for a particular programming language or program development environment. For example, each step recorded in a script may correspond to a particular function or group of functions, and the prototyping environment may create a program that calls the appropriate functions. In various embodiments, additional elements may also be included in the created program. For example, as described above, the created program may include functions or nodes operable to load or acquire an image, display the image, etc.

The program code implementing the image processing function steps in the script preferably has an execution time that corresponds to the execution time of the code that is called in step 306 of FIG. 3, so that the time requirements determined in the method of FIG. 3 apply to the generated program. For example, in one embodiment, the executable code called in step 306 and the executable code used in the program may be the same, e.g., by calling a shared library or common component in both cases. In another embodiment, the generated program may utilize an image processing library that is associated with the image processing prototyping environment, e.g., a library that is provided by the vendor of the prototyping environment, so that the various image processing functions are implemented in the same way in both cases, and thus have equivalent running times.

Figure 20:
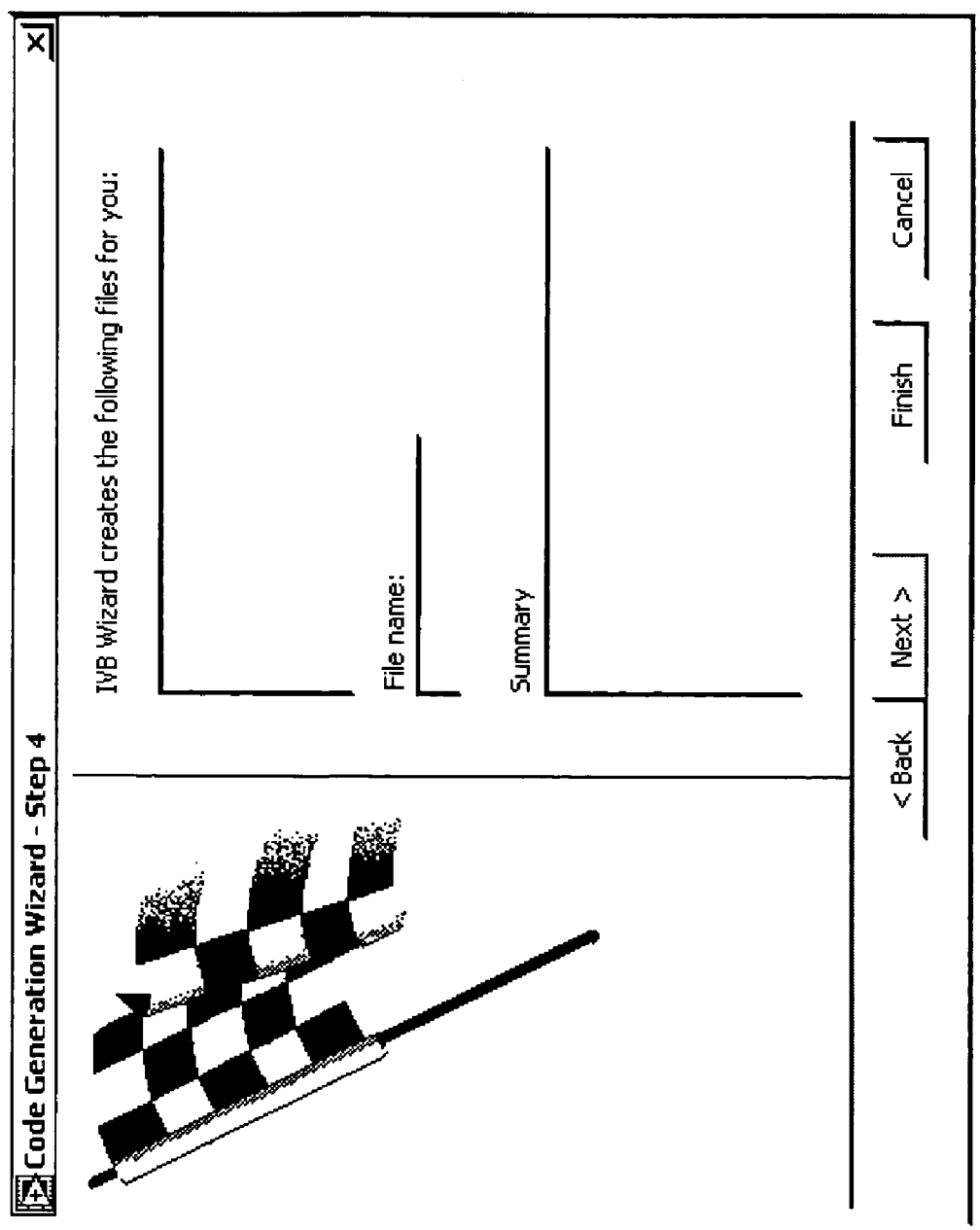
FIG. 20 illustrates a user interface for specifying a file name for a program file.

One or more files including program code may be generated in step 330. FIG. 20 illustrates a user interface for receiving input specifying a file name for a program file. Also, as described above, step 330 may comprise generating other files, e.g., project files, in addition to the file(s) specifying the program code.

As noted above, the flowchart of FIG. 15 represents one embodiment of a method for receiving information to be used in generating a program, and various steps of FIG. 15 may be added, omitted, reordered, combined, etc. For example, the method may receive additional input in addition to that described above, to be used in generating the program. This additional input may pertain, for example, to a particular program development environment that is supported, and/or may serve to enhance the functionality described above. As one example, additional input regarding the image source for a program may be received, e.g., to specify a particular default image file name.

Maintaining an Association Between a Script and a Generated Program

In one embodiment, an association between the script created in the prototyping environment and the program generated from the script may be maintained. This association may enable a user to run the automatically generated program and then return to the prototyping environment in order to view or edit the script used to create the program. The ability to return to the prototyping environment may be useful, for example, if while using the program to process images, it is discovered that the program has an error or needs to be modified for other reasons.

The association between the script and the generated program may be implemented in any of various ways. For example, in one embodiment, a program file may be enabled to store information related to the program; thus, the script information may be stored in the program file when the program is created. In another embodiment, the script information may be stored in another file associated with the program, such as a project or resource file. In another embodiment, the prototyping environment may be operable to store the script information. For example, when the program is created, the prototyping environment may determine or receive a key usable for uniquely identifying the program, and this key may later be used by the prototyping environment to retrieve the script information used to create the program. In another embodiment, information specifying the script used to create the program may not be maintained, but rather, the prototyping environment may be operable to read the program and automatically re-create the script used to create the program.

In various embodiments, a user may perform any of various actions in order to return to the prototyping environment to view or edit the script associated with a program. For example, the program may be a program associated with a development environment that is coupled with the prototyping environment, and the user may be able to automatically return to the prototyping environment by issuing a command to the development environment, e.g., by selecting a menu item. In another embodiment, the user may first view the user interface for the prototyping environment and then select the script corresponding to the program.

In one embodiment, a program created from a script may be "locked". While the program is locked, the user may be prevented from modifying the program. The ability to lock the program may be useful, for example, in order to ensure that the state of the program corresponds to the state of the script used to create the program when the user returns to the prototyping environment. If the user desires to modify the program, the user may unlock the program, e.g., by selecting an option in a development environment associated with the program. The mechanisms of locking and unlocking a program may be implemented in any of various ways, according to methods supported by a particular system or programming environment.

Figure 21:
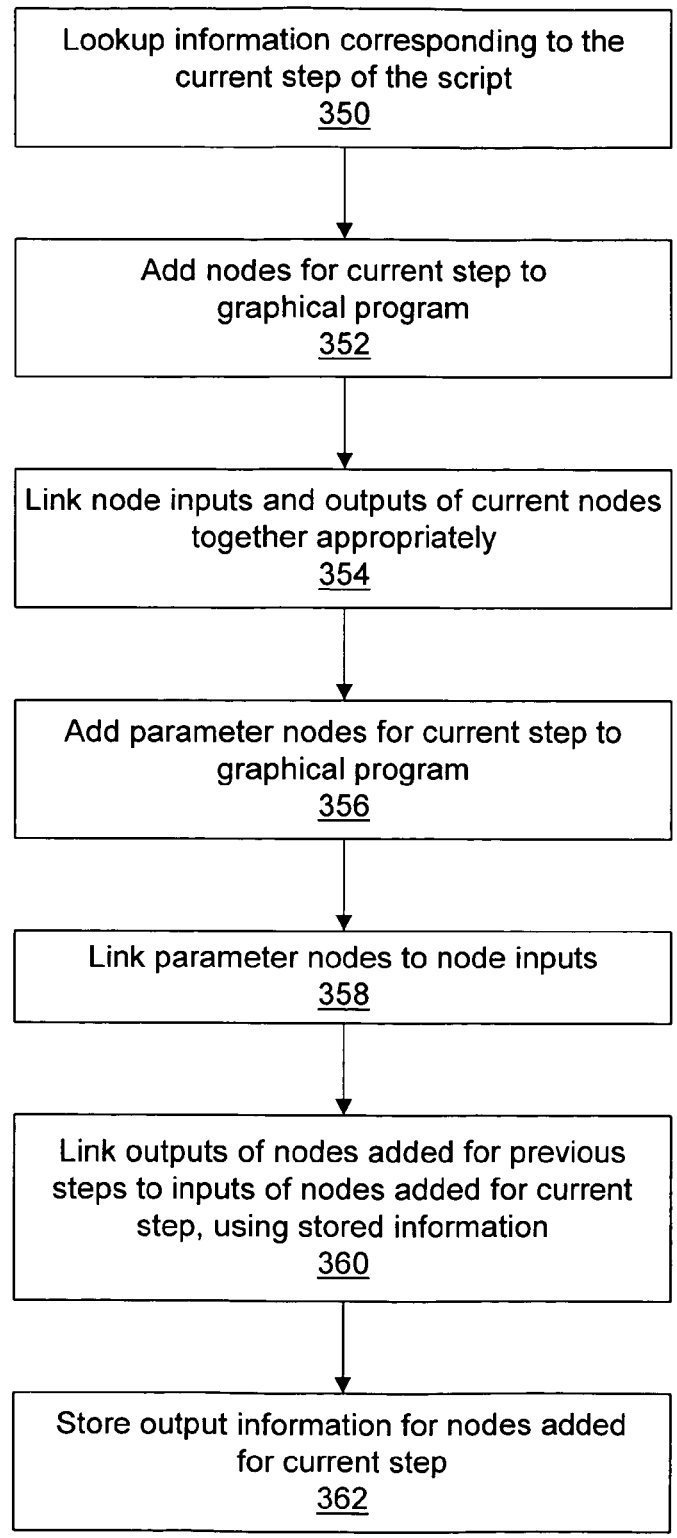
FIG. 21 is a flowchart diagram illustrating one embodiment of automatically generating a program from a script, wherein the generated program is a graphical program.

FIG. 21—Automatic Graphical Program Generation

As discussed above, any of various types of programs, including graphical programs, may be automatically generated from a script developed in the prototyping environment. FIG. 21 is a flowchart diagram illustrating one specific embodiment of automatically generating a program from a script, wherein the generated program is a graphical program. As described above, the script may include a number of steps, where each step represents a particular image processing function. FIG. 21 illustrates a method that may be performed for each step in the script, in order to generate graphical program code corresponding to the script step. It is noted that various steps of FIG. 21 may be combined, reordered, altered, omitted, etc.

Step 350 of FIG. 21 is to lookup information corresponding to the current step of the script, e.g., from a database. For example, each possible image processing function step that can appear in a script may have a corresponding key, such as the image processing function name, that may be used to lookup the information.

A graphical program diagram may comprise nodes which are connected together to model the program data flow or control flow, where various nodes represent different functional blocks. For each image processing function step of a script, the step may be implemented in a graphical program using one or more nodes that are connected to each other appropriately. For example, FIG. 6 illustrates a convolution filter function step in the prototyping environment script window. This convolution filter function may correspond to a single node available in a graphical programming system, wherein the node implements the convolution functionality. Alternatively, the convolution filter function may be implemented using a plurality of graphical program nodes. The graphical program nodes may be any of various types of nodes supported by a particular graphical programming system, including subprogram nodes, function nodes, etc. In the preferred embodiment, the graphical programming system provides a library of nodes related to image processing functions, which may be used in implementing steps of the script.

Thus, the information retrieved in step 350 may include a list of one or more nodes to add to the graphical program, in order to implement the current step of the script. The information may also include information specifying how the inputs and outputs of these nodes should be linked to each other, in order to accomplish the desired data or control flow. The link information may be specified in any of various ways, as appropriate for a particular graphical programming system. For example, in one embodiment, each graphical program node includes terminals corresponding to each node input or output. Thus, the link information may specify pairs of node terminals that should be connected to each other.

The information retrieved in step 350 also may include parameter information. As described above, various parameters or settings may be associated with each step in a script. These parameters may be represented in the graphical program as leaf nodes which provide input to or display output from the nodes which implement the current step of the script. Thus, the parameter information may include a list of leaf nodes to add to the graphical program, in order to provide or accept the parameter values to or from the other nodes. A type may be specified for each parameter. For example, if an input parameter is an integer value, a corresponding leaf node may be created as an integer constant node, i.e., a node which is operable to output an integer constant. A default value for the parameter may also be specified. For input parameters, information specifying which node input the output of the corresponding leaf node should connect to may also be specified. For output parameters, information specifying which node output the input of the corresponding leaf node should connect to may also be specified.

As discussed above, in one embodiment, the user may designate certain parameter values that he wishes to be able to change or display interactively. For these parameters, a leaf node constant representing the parameter value is preferably not connected to the node input/output that receives/generates the parameter value. Instead, a user interface control or indicator representing the parameter value may be created, and the node input or output that receives or generates the parameter value may be configured to receive or set the value of this user interface control or indicator. In one embodiment, when a user interface control or indicator is created, a corresponding node may be automatically created in the graphical program diagram. Thus, the output or input of the node corresponding to the user interface control/indicator may simply be connected to the node input or output that receives or generates the parameter value. For other embodiments, the node input/ouput may be connected to the user interface control/indicator value in any of various other ways, as supported by the particular embodiment.

The parameter information obtained in step 350 may include information specifying the type of user interface control/indicator to create and possibly other user interface information. For example, for a parameter that may be one of several strings, the parameter information may specify that a user interface control for selecting from a list of strings should be created and may specify the list of strings to configure the control with. Alternatively, the system may be operable to automatically create an appropriate user interface control or indicator by examining the type information of the node input or output that control or indicator connects to. This automatic creation of user interface controls/indicators is discussed below.

In step 352, the nodes determined in step 350 are added to the graphical program. Elements may be added to the graphical program in any of various ways. For example, the application that generates the graphical program may comprise program logic for creating a graphical program file that is formatted appropriately. However, in the preferred embodiment, the application interfaces with a graphical programming system and requests the graphical programming system to create the desired program.

In step 354 the inputs and outputs of the nodes added in step 352 are linked to each other appropriately, using the information from step 350. Again, the application may perform step 354 directly or may request a graphical programming system to connect the node inputs and outputs.

In step 356, nodes representing parameters to the image processing functions for the current step of the script are added to the graphical program, using the information from step 350. For example, various leaf nodes may be added, as described above. In step 358, the outputs of the parameter nodes are connected to the appropriate inputs of the nodes added in step 352. Step 356 may also involve configuring the leaf nodes with an appropriate value. As noted above, when a step is added to a script, parameter values specified by the user (or default values) may be associated with the step. These parameter values may be used to configure the leaf nodes with an appropriate value. For example, in FIG. 8, a maximum threshold parameter value of 255 is illustrated. In this example, a leaf node representing the maximum threshold parameter may be created as an integer constant and may configured with a value of 255. Thus, this leaf node would provide the value 255 to the node input that the leaf node is connected to. For a parameter that is interactively changeable, steps 356 and 358 may involve creating a user interface control for the parameter and linking the control to the appropriate node input, as described above.

Steps 350–358 describe adding graphical program elements pertaining to a particular step of the script to the graphical program. For a given current step, it may be necessary to link various outputs of nodes added for previous steps to inputs of nodes added for the current step. For each step, information regarding outputs of nodes added for the step may be stored, e.g., in a table in memory. In step 360, this stored information may be used to connect the appropriate outputs of nodes previously added to inputs of nodes added for the current step. For example, in addition to specifying the desired links between nodes added for the current step of the script, the information obtained in step 350 may also specify when an input of a node added for the current step should be connected to an output of a node added for a previous step in the script. The stored information may then be searched to determine which previous node output should connect to the current node input. Any of various types of information enabling this determination may be stored, as appropriate for a particular embodiment, such as output terminal names, output data types, etc.

In step 362, output information relating to nodes added for the current step of the script is stored, so that this information will be available for subsequent steps.

Figure 22:
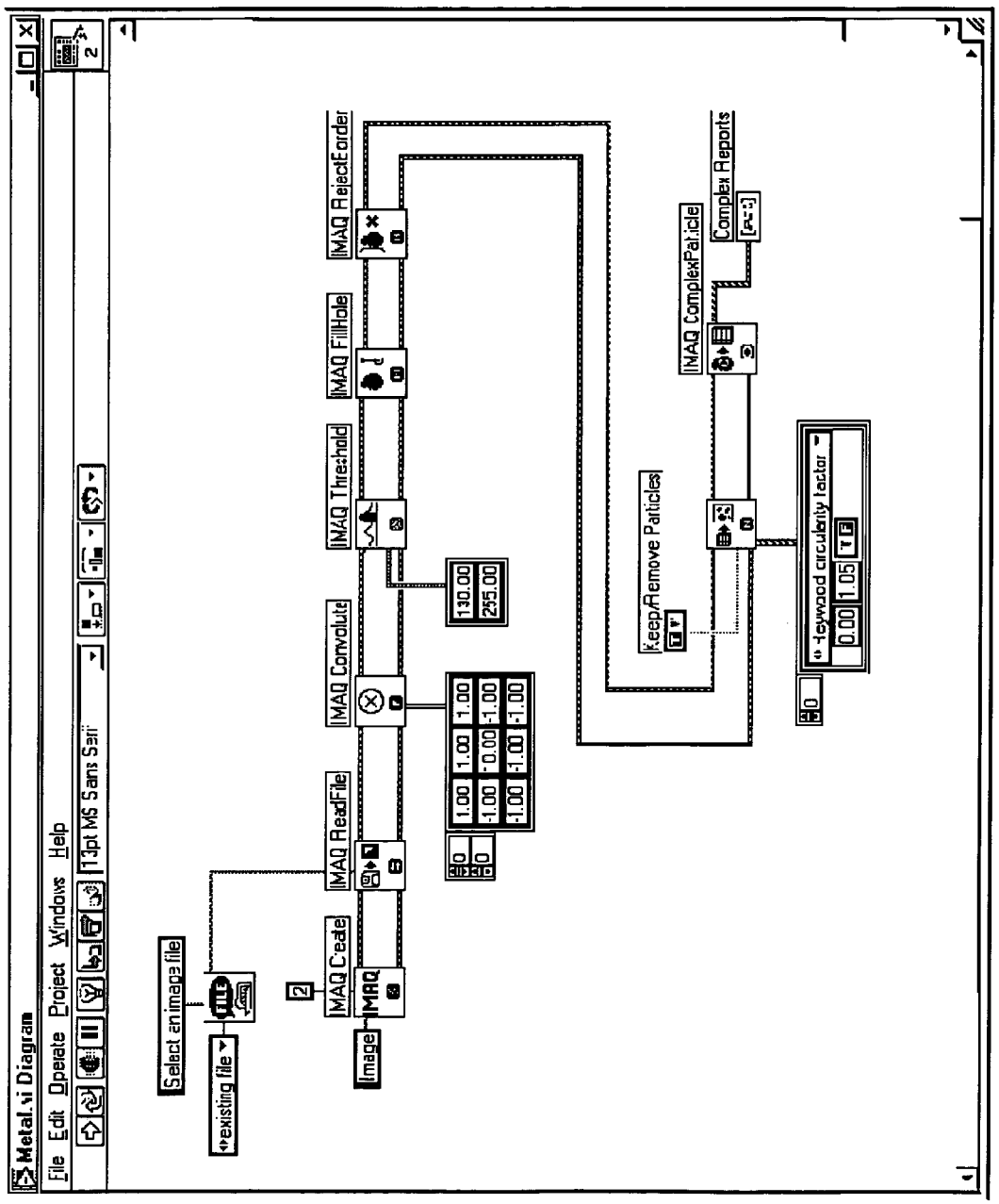
FIG. 22 illustrates an exemplary graphical program that is automatically generated from the image processing algorithm script example discussed with reference to FIGS. 5–11.

FIGS. 22–23: Example of a Generated Graphical Program

FIG. 22 illustrates an exemplary graphical program that is automatically generated from the image processing algorithm script example discussed with reference to FIGS. 5–14. For convenience, the graphical program diagram is grouped into portions, and each portion is labeled in order to illustrate which step of the script the portion implements. As described above, each portion includes one or more nodes which implement the image processing function specified by the corresponding step of the script. For nodes that accept or provide parameter values, the nodes are connected to leaf nodes that provide or accept the parameter values to or from the nodes.

The graphical program of FIG. 22 corresponds to the code generation user interface screen shown in FIG. 19, in that the program is operable to accept interactive user input specifying the input parameters selected in FIG. 19 and is operable to display the output parameters selected in FIG. 19. FIG. 23 illustrates a user interface panel including user interface controls and indicators corresponding to the selected input and output parameters. This user interface panel may be generated along with the graphical program block diagram. Each user interface control or indicator on the user interface panel has a corresponding leaf node in the block diagram. For example, the block diagram leaf node labeled "Range" corresponds to the user interface control labeled "Range", and the output of the "Range" leaf node is connected to the input of the "IMAQ Threshold" node, so that the "IMAQ Threshold" node receives the new range values as they are adjusted by a user.

Note that for the parameters which are not selected in FIG. 19, no corresponding user interface controls or indicators are created, and values for these parameters are instead hardcoded into the block diagram. For example, the "Keep Particles" item is unselected in FIG. 19, and a Boolean constant leaf node labeled "Keep/Remove Particles" is connected to one of the nodes which implement step 5 of the script. The constant value may be set to True or False, e.g., depending on the settings the user specified when the script was created.

As noted above, in one embodiment, an appropriate user interface control or indicator for a selected parameter may be automatically created by examining the type information of the node input or output that the control or indicator connects to. For example, as discussed below, the prototyping environment may interface with a graphical programming system and may request the graphical programming system to create each graphical program object. The graphical programming system may be operable to automatically create a user interface control or indicator that matches the data expected by a node input or produced by a node output. For example, with respect to the block diagram node labeled "IMAQ Threshold", the graphical programming system may examine the input terminal of the node and discover that the terminal expects two integer values. The graphical programming system may then create a user interface control appropriate for providing two integer values, such as the "Range" control illustrated in FIG. 23.

Interfacing with a Graphical Programming System

As described above, in one embodiment the prototyping environment may interface with a graphical programming system in order to automatically generate a graphical program implementing a script. The graphical programming system may support an application programming interface (API) that allows callers to create or edit graphical programs and add objects or nodes to graphical programs in order to achieve the desired functionality. For example, the prototyping environment may first call an API function to create a graphical program object, obtaining a reference to this object. The prototyping environment may then call an API function to add nodes representing the appropriate image processing functions to the graphical program object.

The graphical programming system may support any of various types of APIs for callers to use. For example, many applications are operable to call standard ActiveX/COM components. Thus, in one embodiment, the graphical programming system may expose COM objects that the prototyping environment may call to create the graphical program. In another embodiment, the graphical programming system may provide a graphical API for creating graphical programs.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A memory medium comprising program instructions for creating an image processing algorithm, wherein the program instructions are executable to implement:
   performing one or more image processing functions on an image in response to user input;
   recording the one or more image processing functions, wherein the one or more image processing functions define an image processing algorithm;
   receiving user input specifying desired execution time criteria for the image processing algorithm;
   executing the image processing algorithm in response to user input;
   measuring an execution time that elapses during said executing the image processing algorithm; and
   automatically changing the image processing algorithm based on the specified execution time criteria in order to reduce the execution time of the image processing algorithm, wherein said automatically changing the image processing algorithm is not performed directly in response to user input.

2. The memory medium of claim 1, wherein the program instructions are further executable to implement:
   receiving user input to undo the changes made to the image processing algorithm in said automatically changing.

3. The memory medium of claim 1, wherein said automatically changing the image processing algorithm comprises automatically changing one or more parameters of at least one image processing function in the image processing algorithm.

4. The memory medium of claim 1, wherein said automatically changing the image processing algorithm comprises automatically changing a number of pixels used in at least one image processing function in the image processing algorithm.

5. A computer-implemented method for creating an image processing algorithm, comprising:
   performing one or more image processing functions on an image in response to user input;
   recording the one or more image processing functions, wherein the one or more image processing functions define an image processing algorithm;
   receiving user input specifying desired execution time criteria for the image processing algorithm;
   executing the image processing algorithm in response to user input;
   measuring an execution time that elapses during said executing the image processing algorithm; and
   automatically changing the image processing algorithm based on the specified execution time criteria in order to reduce the execution time of the image processing algorithm, wherein said automatically changing the image processing algorithm is not performed directly in response to user input.

6. The method of claim 5, further comprising:
   receiving user input to undo the changes made to the image processing algorithm in said automatically changing.

7. The method of claim 5, wherein said automatically changing the image processing algorithm comprises automatically changing one or more parameters of at least one image processing function in the image processing algorithm.

8. The method of claim 5, wherein said automatically changing the image processing algorithm comprises automatically changing a number of pixels used in at least one image processing function in the image processing algorithm.

9. A memory medium comprising program instructions for creating an image processing algorithm, wherein the program instructions are executable to implement:
   performing one or more image processing functions on an image in response to user input;
   recording the one or more image processing functions, wherein the one or more image processing functions define an image processing algorithm;
   executing the image processing algorithm in response to user input;
   measuring an execution time that elapses during said executing the image processing algorithm;
   automatically generating one or more suggested changes to the image processing algorithm for reducing the execution time of the image processing algorithm; and
   displaying information indicating the one or more suggested changes.

10. The memory medium of claim 9, wherein the program instructions are further executable to implement:
    receiving user input accepting one or more of the suggested changes; and
    automatically making the accepted changes to the image processing algorithm.

11. The memory medium of claim 9,
    wherein one or more of the image processing functions have associated parameters;
    wherein said automatically generating one or more suggested changes comprises automatically generating at least one suggested change to a parameter value associated with an image processing function.

12. The memory medium of claim 9, wherein the program instructions are further executable to implement:
    receiving user input specifying desired execution time criteria;
    wherein said automatically generating one or more suggested changes is performed based on said execution time criteria.

13. A computer-implemented method for creating an image processing algorithm, comprising:
- performing one or more image processing functions on an image in response to user input;
- recording the one or more image processing functions, wherein the one or more image processing functions define an image processing algorithm;
- executing the image processing algorithm in response to user input;
- measuring an execution time that elapses during said executing the image processing algorithm;
- automatically generating one or more suggested changes to the image processing algorithm for reducing the execution time of the image processing algorithm;
- displaying information indicating the one or more suggested changes to the image processing algorithm;
- receiving user input accepting one or more of the suggested changes; and
- automatically making the accepted changes to the image processing algorithm.

* * * * *